(12) United States Patent
Tajime

(10) Patent No.: US 6,915,018 B2
(45) Date of Patent: Jul. 5, 2005

(54) COMPRESSED MOVING PICTURE RE-ENCODING APPARATUS AND COMPRESSED MOVING PICTURE RE-ENCODING METHOD

(75) Inventor: Junji Tajime, Tokyo (JP)

(73) Assignee: NEC Corporation, Tokyo (JP)

(*) Notice: Subject to any disclaimer, the term of this patent is extended or adjusted under 35 U.S.C. 154(b) by 653 days.

(21) Appl. No.: 09/742,113

(22) Filed: Dec. 22, 2000

(65) Prior Publication Data

US 2001/0006562 A1 Jul. 5, 2001

(30) Foreign Application Priority Data

Dec. 24, 1999 (JP) .......................................... 11-367637

(51) Int. Cl.[7] .............................................. G06K 9/36
(52) U.S. Cl. .................. 382/251; 382/236; 375/240.01; 704/500
(58) Field of Search ................................ 382/232, 233, 382/235, 236, 248, 251, 253, 257, 260, 263, 274, 276, 277, 287, 291, 294, 305, 169, 250, 246, 247, 244, 238; 704/500; 341/61; 375/240.01, 240.03, 240.23, 240.2, 240.22, 240.15, 240.3, 224, 240.04; 708/203; 345/555; 348/384.1, 440, 27; 358/426.01; 380/212; 370/521

(56) References Cited

U.S. PATENT DOCUMENTS

| | | | | |
|---|---|---|---|---|
| 5,657,015 A | * | 8/1997 | Nakajima et al. ............. | 341/61 |
| 5,684,714 A | * | 11/1997 | Yogeshwar et al. ......... | 370/521 |
| 5,805,224 A | * | 9/1998 | Keesman et al. ......... | 375/240.04 |
| 5,933,451 A | * | 8/1999 | Ozkan et al. ................ | 375/224 |
| 5,956,686 A | * | 9/1999 | Takashima et al. ......... | 704/500 |
| 6,173,012 B1 | * | 1/2001 | Katta et al. ............. | 375/240.15 |
| 6,259,739 B1 | * | 7/2001 | Kondo ................... | 375/240.23 |
| 6,535,251 B1 | * | 3/2003 | Ribas-Corbera ....... | 375/240.03 |

FOREIGN PATENT DOCUMENTS

| | | |
|---|---|---|
| JP | 05-260458 | 10/1993 |
| JP | 07-312756 | 11/1995 |
| JP | 8-23539 | 1/1996 |
| JP | 8-51631 | 2/1996 |
| JP | 2000-261800 | 9/2000 |

* cited by examiner

*Primary Examiner*—Bhavesh M. Mehta
*Assistant Examiner*—Seyed Azarian
(74) *Attorney, Agent, or Firm*—McGinn & Gibb, PLLC

(57) ABSTRACT

To reduce a processing delay when re-encoding compressed moving pictures, and provide a compressed moving picture re-encoding apparatus with higher picture quality. Complexity measure computing unit computes respective complexity measures in two or more kinds of prescribed predetermined periods or numbers of pictures, using either or both of a quantizer step size and a number of bits of an input compressed moving picture stream. Also, picture group quantizer step size computing unit outputs a particular complexity measure from a plurality of complexity measures, and quantizer step size adjusting unit computes the quantizer step size using a pre-set average bit rate and the output complexity measure. Moreover, a quantizer step size selector that adjusts the quantizer step size every particular period according to a difference (excess or deficiency) between a target number of bits and an actual number of bits, computes the quantizer step size that is used in re-encoding, and performs rate control by taking the quantizer step size and the quantizer step size in the input compressed moving picture stream as input, and outputting the quantizer step size that is used in actual re-encoding. In this way, re-encoding is performed with a variable bit rate, and a compressed moving picture stream whose bit rate has been changed is output.

48 Claims, 15 Drawing Sheets

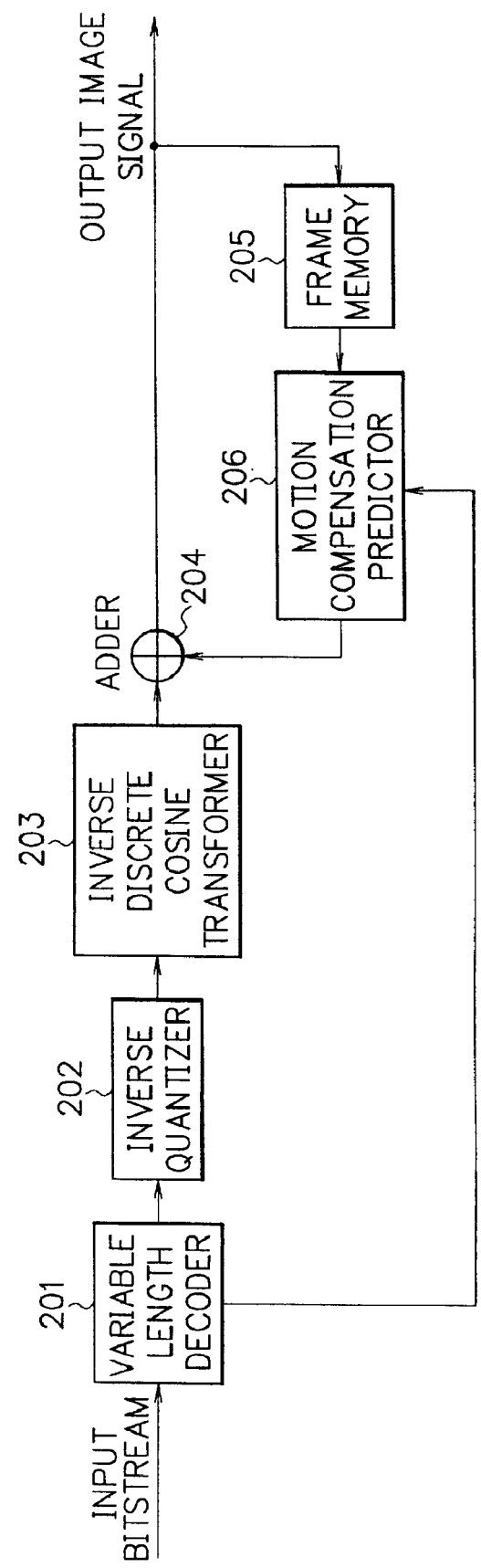
F I G. 12

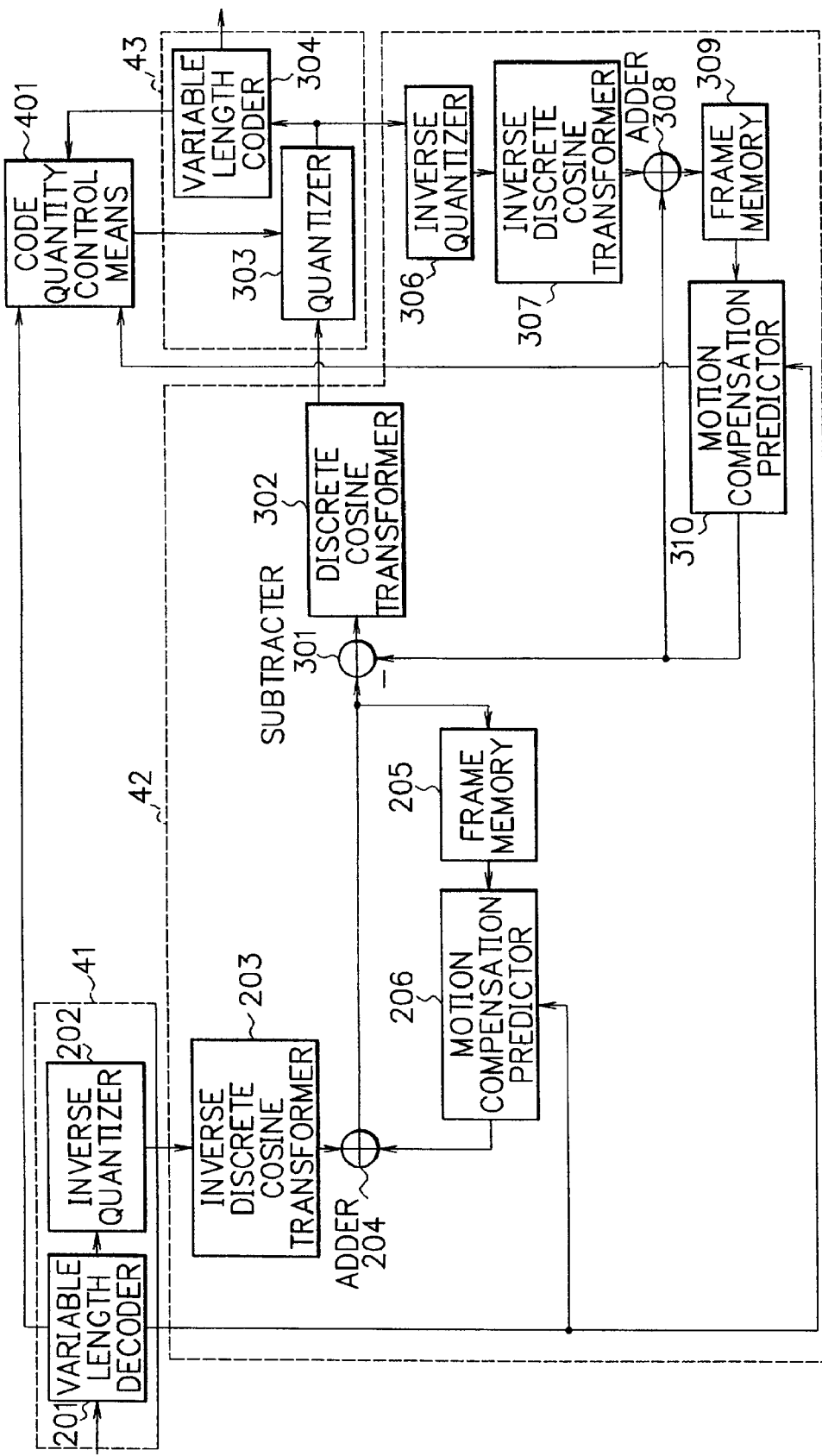
F I G. 14

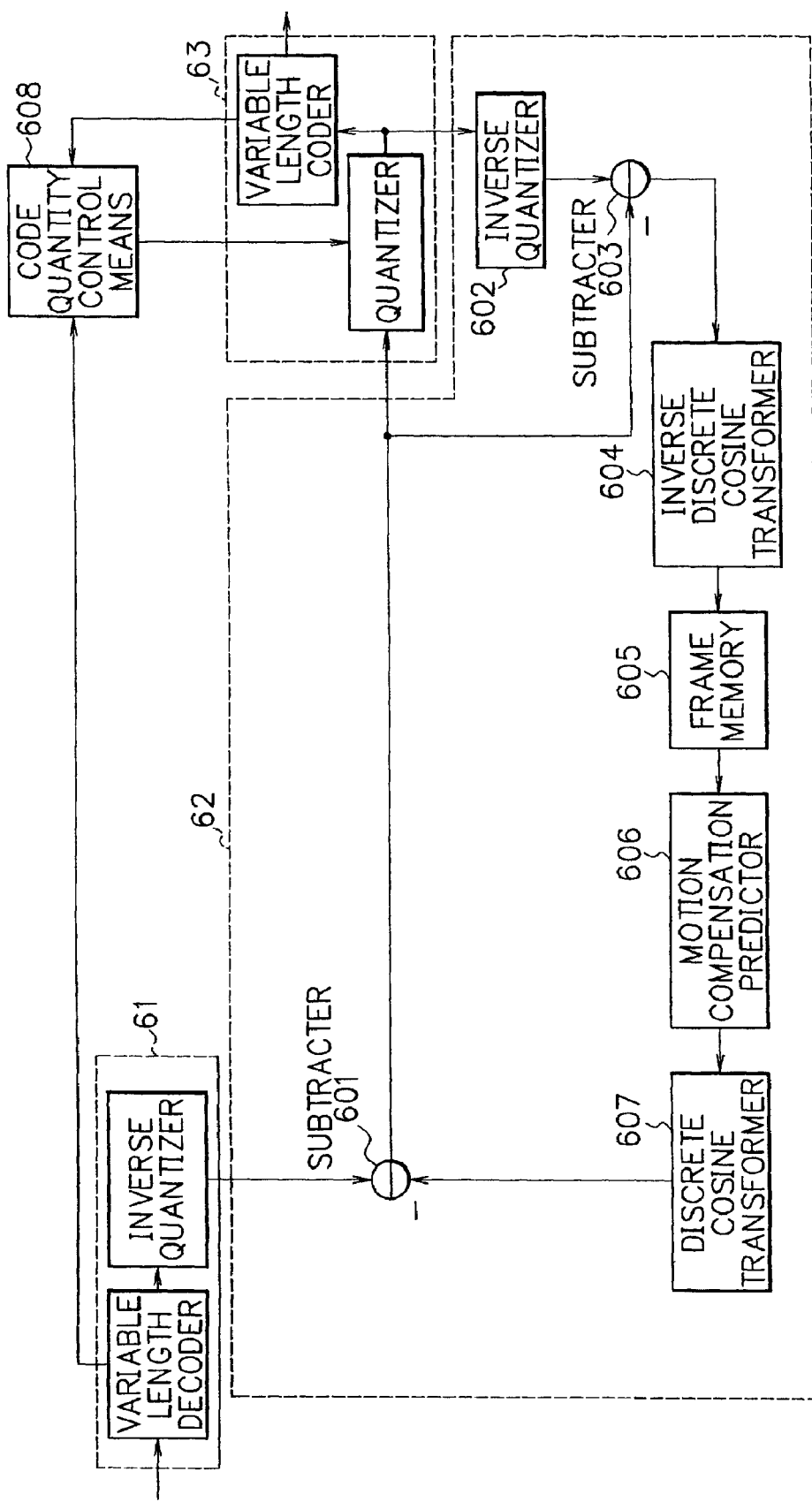

COMPRESSED MOVING PICTURE RE-ENCODING APPARATUS AND COMPRESSED MOVING PICTURE RE-ENCODING METHOD

BACKGROUND OF THE INVENTION

The present invention relates to a compressed moving picture re-encoding apparatus and compressed moving picture re-encoding method, and relates in particular to a compressed moving picture re-encoding apparatus and compressed moving picture re-encoding method that reduce a number of bits of a compressed moving picture constituting an input signal.

Prior Art

When a video bit stream is transmitted and stored by such digital broadcast systems and services, etc., the video bit stream is compressed before being transmitted and stored. Also, recently ISO/ICE IS13818-2 (MPEG-2 VIDEO) and the like have been standardized as video bit stream (video bit stream) compression methods, and are used in digital broadcast systems and services, etc.

On the other hand, in broadcasting stations or in the home, applications are anticipated by which a compressed moving picture stream compressed at a prescribed bit rate is transmitted or stored after being re-encoded as a compressed moving picture stream with a different bit rate. As an example, there is a function for recording pictures onto digital recording apparatuses.

A compressed moving picture stream distributed from a broadcasting station to the home is encoded at a prescribed bit rate. When a compressed moving picture stream is distributed to a limited storage capacity for the purpose of allowing the viewer an extended recording time, for example, it is necessary to re-code the compressed moving picture stream at a lower bit rate than that at which it was distributed. In this case, it is desirable to suppress deterioration in the picture quality when re-encoding is performed. Below, the prior art relating to such re-encoding processing of a compressed moving picture stream will be described in particular.

In the following description, the compressed moving picture stream is assumed to be compressed in accordance with MPEG-2 VIDEO. The following description thus applies to an MPEG-2 bit stream. With MPEG-2 VIDEO, a picture is divided into blocks consisting of groups of pixels, and space domain signals are converted to frequency domain signals by executing a Discrete Cosine Transform (DCT) on each block. Each frequency component obtained by means of this Discrete Cosine Transform is quantized with a defined quantizer step size, subjected to variable length encoding by allocating a variable length code to the quantization conversion coefficient, and output as an MPEG-2 bit stream. A compressed moving picture re-encoding apparatus basically implements its function by de-encoding the MPEG-2 bit stream, which is the input signal, to a video bit stream, and re-encoding the de-encoded video bit stream. A compressed moving picture re-encoding apparatus is therefore configured by a decoder and coder connected in series.

FIG. 12 shows the basic configuration of a decoder. The decoder shown in FIG. 12 is configured by a variable length decoder 201, an inverse quantizer 202, an inverse discrete cosine transformer 203, an adder 204, a frame memory 205, and a motion compensation predictor 206.

FIG. 13 shows the basic configuration of a coder. The coder shown in FIG. 13 is configured by a subtracter 301, a discrete cosine transformer 302, a quantizer 303, a variable length coder 304, rate control control means 305, an inverse quantizer 306, an inverse discrete cosine transformer 307, an adder 308, a frame memory 309, and a motion compensation predictor 310. FIG. 14 shows the basic configuration of a compressed moving picture re-encoding apparatus. Below, for purposes of explanation, the variable length decoder 201 and inverse quantizer 202 are designated the de-encoding path section 41, the quantizer 303 and variable length coder 304 are designated the encoding path section 43, and the component sections other than the deencoding path section 41, encoding path section 43, and rate control control means 401, are designated the error compensation section 42.

Since, as stated above, the compressed moving picture re-encoding apparatus shown in FIG. 14 is configured by a decoder and a coder connected in series, the decoder shown in FIG. 12 and the coder shown in FIG. 13 are connected in series. Also, for the purposes of achieving high-speed processing and improved picture quality, the compressed moving picture re-encoding apparatus re-uses the encoding information de-encoded by the variable length decoder 201 as a encoding parameter when performing re-encoding.

In contrast to this, an apparatus that performs re-encoding of compressed moving pictures simply and at lower cost is disclosed in Japanese Patent Laid-Open No. 8-23539, Japanese Patent Laid-Open No. 8-51631, and so forth. FIG. 15 shows the basic configuration of the compressed moving picture re-encoding apparatus disclosed in Japanese Patent Laid-Open No. 8-23539. In order to simplify the processing, the compressed moving picture re-encoding apparatus shown in FIG. 15 has a configuration that omits the error compensation section 42 in FIG. 14, and is configured by a de-encoding path 51, a encoding path 52, and a rate control controller 501, only. However, when this apparatus is used, picture quality degradation occurs because of the accumulation of quantization error due to re-quantization.

FIG. 16 shows the basic configuration of the compressed moving picture re-encoding apparatus disclosed in Japanese Patent Laid-Open No. 8-51631. The compressed moving picture re-encoding apparatus shown in FIG. 16 achieves simplification of the processing by using an error compensation section 62 equivalent in terms of conversion to the error compensation section 42 in FIG. 14.

These examples of the prior art are items disclosed with regard to the configuration of a compressed moving picture re-encoding apparatus, and have not been described in relation to rate control in the rate control means 401. Next, the prior art for the code rate control method of a compressed moving picture re-encoding apparatus will be described.

As prior art example 1, the method of the MPEG-2 test model (Test Model 5, ISO/ICE JTC1/SC21/WG11/N0400, April 1993), which is a code rate control method for a encoding apparatus, is known. With this method, a defined-bit-rate encoding method is used that attempts to define the number of bits, generated by intra-frame encoding and inter-frame predictive encoding, every given unit time. As a result, taking a GOP (Group Of Pictures) as the unit, the number of bits is controlled by setting the base quantizer step size that is set for each macro block unit whereby the pictures are divided into 16×16 pixels, so that the number of bits generated by encoding processing for each GOP is defined.

However, as the above described prior art example 1 is a code rate control method for a encoding apparatus, and information that is not contained in the MPEG-2 bit stream is necessary for control, it cannot be applied directly. In this respect, a code rate control method suited to a compressed moving picture re-encoding apparatus has been proposed in place of the code rate control method in the above described prior art example 1. For example, as prior art example 2, the code rate control method in the compressed moving picture re-encoding apparatus shown in FIG. 15 is disclosed in U.S. Pat. No. 5,657,015.

With this method, the base quantizer step size is set from the picture average quantizer step size after re-encoding, the picture target number of bits, and the actual number of bits, for each macro block. Next, rate control is performed by computing the activity using the picture average quantizer step size, the ratio of the quantizer step size, or the number of bits of picture, of the macro block for which encoding is performed, and the ratio of the number of bits of the macro block for which encoding is performed, and adjusting the base quantizer step size.

As prior art example 3, U.S. Pat. No. 5,805,224 is disclosed. With this method, the sub-picture target number of bits at the time of re-encoding is set from the input bit rate, the output bit rate, and the number of bits of the picture for which encoding is performed, and the picture complexity measure is found from the product of the number of bits and the quantizer step size. Next, the complexity measure is distributed according to the sub-picture target generated a number of bits, and the sub-picture quantizer step size is set. Then, the difference between the target number of bits and the actual number of bits is reflected in the control, and the number of bits adjustment is performed by adjusting the quantizer step size. In prior art example 2 and prior art example 3, the target number of bits at the time of re-encoding is set using the number of bits of the input compressed moving picture stream picture, the input bit rate, and the output bit rate.

SUMMARY OF THE INVENTION

However, with the above described methods in the prior art, since the target number of bits at the time of re-encoding is set in accordance with the number of bits of the input compressed moving picture stream, and the generated number of bits is reduced virtually uniformly regardless of the moving picture scene characteristics or the number of bits necessary for encoding, these methods are attended by the problem of picture quality degradation.

It is an object of the present invention to provide a compressed moving picture re-encoding apparatus and a compressed moving picture re-encoding method that realize shortening of the processing delay, improvement of the picture quality, and improvement of the encoding efficiency, when compressed moving picture re-encoding is performed. Further, it is an object of the present invention to provide a compressed moving picture re-encoding apparatus and a compressed moving picture re-encoding method that realize moving picture data re-encoding more efficiently and with a higher picture quality in a compressed moving picture data re-encoding apparatus that is capable of real-time processing.

To achieve the above objects, the compressed moving picture re-encoding apparatus of the present invention has an input compressed moving picture stream, generated by compression of moving picture data, as an input signal, performs re-encoding at a pre-set average bit rate and at a variable bit rate, and has an output compressed moving picture stream whose bit rate has been changed as an output signal; and comprises means for computing the quantizer step size that is used in re-encoding, and means for inputting the computed quantizer step size, and the quantizer step size in the input compressed moving picture stream, and outputting the quantizer step size that is used in actual re-encoding.

Also, it is desirable that the compressed moving picture re-encoding apparatus further comprises means for selecting the larger quantizer step size from the above described quantizer step size used in re-encoding and the above described quantizer step size in the input compressed moving picture stream, means for computing the respective complexity measures in two or more kinds of prescribed predetermined periods or numbers of pictures, using either or both of the quantizer step size and the number of bits in either the input compressed moving picture stream or the re-enencoded compressed moving picture stream, means for outputting a prescribed complexity measure from a plurality of complexity measures, and means for computing the quantizer step size using a pre-set average bit rate and the output complexity measure, in which the quantizer step size is adjusted every prescribed period according to the difference (excess or deficiency) between the target number of bits and the actual number of bits, to give the quantizer step size that is used in re-encoding.

In addition, it is desirable that pictures from a picture re-encoded at the start of re-encoding to a picture immediately preceding that for which re-encoding is currently being performed, or a plurality of pictures including one image encoded within a frame are used as a plurality of pictures used as the above prescribed period or number of pictures, a group of blocks into which a picture is divided is used for the prescribed period for adjusting the base quantizer step size according to excess or deficiency with respect to the target number of bits, and the compressed moving picture re-encoding apparatus further comprises means for selecting the minimum complexity measure among a plurality of complexity measures.

Moreover, it is desirable that the compressed moving picture re-encoding apparatus comprises means for applying weighting, according to the image characteristics, to the quantizer step size used in the above described re-encoding, and adjusting that quantizer step size; means for computing the ratio of the complexity measure in a prescribed defined period or number of pictures to the complexity measure of the object of re-encoding, using either or both of the quantizer step size and the number of bits of the input compressed moving picture stream, performing weighting of the quantizer step size, and adjusting that quantizer step size; and further comprises means for computing the ratio of the respective complexity measures in a prescribed period or number of pictures to the complexity measure of the object of re-encoding, using either or both of the quantizer step size and the number of bits of the input compressed moving picture stream, performing weighting of the quantizer step size, and adjusting that quantizer step size.

Also, it is desirable that the compressed moving picture re-encoding apparatus comprises means for computing the respective complexity measures in two or more kinds of prescribed periods or numbers of pictures, using either or both of the quantizer step size and the number of bits of the above described input compressed moving picture stream; means for outputting a prescribed complexity measure from a plurality of complexity measures; means for computing the quantizer step size using a pre-set average bit rate and the output complexity measure; means for computing the average quantizer step size every prescribed period or number of pictures, using the quantizer step size of the input compressed moving picture stream; and means for computing an addition value using the quantizer step size and average quantizer step size, adding the addition value to the quantizer step size of the input compressed moving picture stream, and computing an addition quantizer step size, in which the addition quantizer step size is adjusted every prescribed period according to the difference (excess or deficiency) between the target number of bits and the actual number of bits, to give the quantizer step size that is used in re-encoding.

In addition, it is desirable that the compressed moving picture re-encoding apparatus comprises means for computing the respective complexity measures in two or more kinds of prescribed periods or numbers of pictures, using either or both of the quantizer step size and the number of bits of the above described input compressed moving picture stream; means for outputting a prescribed complexity measure from a plurality of complexity measures; means for computing the quantizer step size using a pre-set average bit rate and the output complexity measure; means for computing the average of the respective quantizer step sizes every prescribed period or number of pictures, according to the encoding prediction mode of the input compressed moving picture stream, using the quantizer step size of the input compressed moving picture stream; means for computing an addition value for each encoding prediction mode, using the quantizer step size and average quantizer step size, adding the addition value to the quantizer step size of the input compressed moving picture stream, and computing an addition quantizer step size, in which the addition quantizer step size is adjusted every prescribed period according to the difference (excess or deficiency) between the target number of bits and the actual number of bits, to give the quantizer step size that is used in re-encoding.

Moreover, it is desirable that the compressed moving picture re-encoding apparatus comprises means for making a threshold setting for a prescribed plurality of quantizer step sizes with respect to said addition quantizer step size, and computing, by using the maximum bit rate among the set bit rates and either or both of the quantizer step size and the number of bits of the input compressed moving picture stream, the maximum bit rate quantizer step size at the maximum bit rate; and means for taking the maximum bit rate quantizer step size and the quantizer step size that is used in re-encoding as input, and outputting the quantizer step size that is used in re-encoding, in which the means for computing the maximum bit rate quantizer step size is rate control that satisfies the ratio of the input bit stream bit rate to the maximum bit rate with respect to the number of bits in the prescribed period or number of pictures of the input compressed moving picture stream, and for the minimum value to be set for the quantizer step size that is used in re-encoding.

The compressed moving picture re-encoding method of the present invention has an input compressed moving picture stream, generated by compression of moving picture data, as an input signal, performs re-encoding at a pre-set average bit rate and at a variable bit rate, and has an output compressed moving picture stream whose bit rate has been changed as an output signal; and comprises a step of computing the quantizer step size that is used in re-encoding, and a step of inputting the computed quantizer step size and the quantizer step size in the input compressed moving picture stream, and outputting the quantizer step size that is used in actual re-encoding.

Also, it is desirable to further comprise a step of selecting the larger quantizer step size from the above described quantizer step size that is used in re-encoding, and the quantizer step size in the input compressed moving picture stream; and to comprise a step of computing the respective complexity measures in two or more kinds of prescribed predetermined periods or numbers of pictures, using either or both of the quantizer step size and the number of bits, in either of the input compressed moving picture stream or re-enencoded compressed moving picture stream; a step of outputting a prescribed complexity measure from a plurality of said complexity measures; and a step of computing the quantizer step size using a pre-set average bit rate and the output complexity measure; and for the quantizer step size to be adjusted every prescribed period according to the difference (excess or deficiency) between the target number of bits and the actual number of bits, to give the quantizer step size that is used in re-encoding.

BRIEF DESCRIPTION OF THE DRAWINGS

FIG. 12 is a block diagram showing the configuration of a decoder according to the prior art;

FIG. 14 is a block diagram showing a sample configuration of a compressed moving picture re-encoding apparatus according to the prior art;

FIG. 16 is a block diagram showing a sample configuration of a compressed moving picture re-encoding apparatus according to the prior art.

DESCRIPTION OF THE PREFERRED EMBODIMENTS

Embodiments of a compressed moving picture re-encoding apparatus and a compressed moving picture re-encoding method according to the present invention will now be described in detail while referring to the accompanying drawings. When FIG. 1 to FIG. 11 are referred to, one embodiment of the compressed moving picture re-encoding apparatus and compressed moving picture re-encoding method of the present invention is indicated.

First Embodiment

Figure 1:
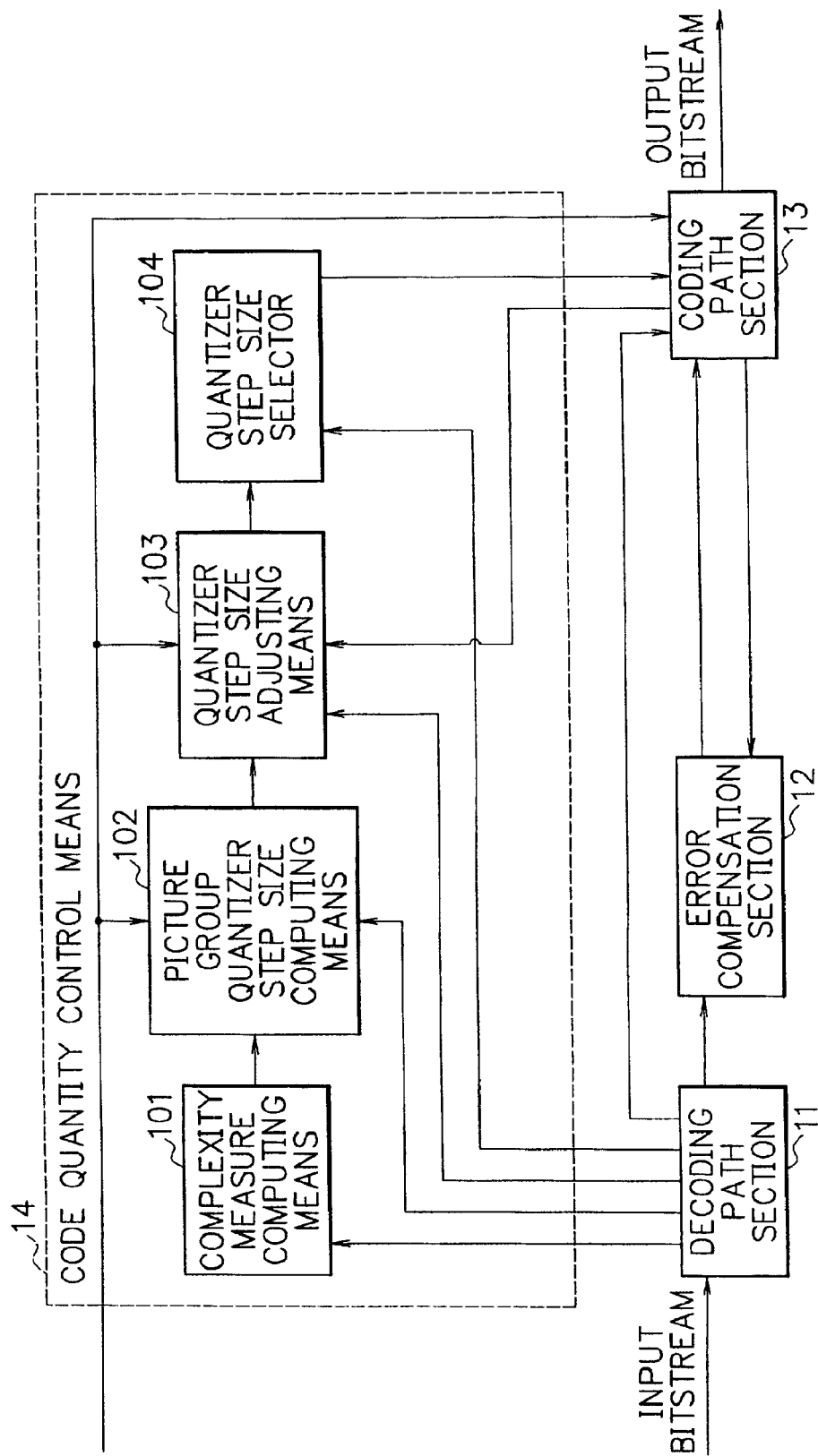
FIG. 1 is a block diagram showing a sample configuration of an embodiment of a compressed moving picture re-encoding apparatus according to the present invention.

FIG. 1 is a drawing for explaining a compressed moving picture re-encoding apparatus according to the present invention. Here, the use of MPEG-2 VIDEO is assumed as the compression encoding method, but the compression-encoding method is not limited to MPEG-2 VIDEO, and any method can be used as long as it is a compression-encoding method that performs rate control by means of the quantizer step size. For example, a method such as ISO/ICE IS11 172 (MPEG-1 VIDEO), or ITU-TH.261 or ITU-TH.263, can be used. Also, for the period for performing complexity measure computation, all pictures encoded from the start of encoding to the present, and a group of pictures consisting of a plurality of pictures, are taken, and a macro block unit is used as the period for adjusting the difference (excess or deficiency) between the target number of bits and the actual number of bits.

This encoding unit only represents one example of an image encoding unit, and any unit can be used for the complexity measure computation period as long as it is a unit whereby defined-period picture quality is controlled, and, as a period for adjusting an excess or deficient quantity, as long as the unit is smaller than the period for performing complexity measure computation in order to perform finer control. Apart from this, as the picture group unit, there are a plurality of picture groups containing one image predicted within a frame, or one picture, or pictures in a given time, etc. Here, according to FIG. 1, a compressed moving picture re-encoding apparatus according to the present invention is configured by a de-encoding path section 11, an error compensation section 12, a encoding path section 13, and rate control means 14.

First, an MPEG-2 bit stream is supplied to the de-encoding path section 11 as input. In the de-encoding path section 11, variable length de-encoding and inverse quantization of the input bit stream are performed, and the input bit stream bit rate and frame rate, the input bit stream quantizer step size per macro block, and the input bit stream number of bits, are supplied to the rate control means 14. Also, in the de-encoding path section 11, a DCT coefficient and motion vector, etc., are supplied to the error compensation section 12, and encoding information that can be re-used in re-encoding is supplied to the encoding path section 13.

In the error compensation section 12, the accumulation of error due to re-quantization is prevented using the pre-re-quantization DCT coefficient, motion vector, etc., supplied from the de-encoding path section 11, and the post-re-quantization DCT coefficient supplied from the encoding path section 13; and the DCT coefficient for performing re-quantization is supplied to the encoding path section 13.

In the encoding path section 13, DCT coefficient re-quantization and re-encoding are performed and an output bit stream is output using the encoding information supplied from the de-encoding path section 11, the DCT coefficient supplied from the error compensation section 12, the quantizer step size supplied from the rate control means 14, and the target average bit rate supplied from outside; and the post-re-encoding number of bits is supplied to the rate control means 14.

In the rate control means 14, the quantizer step size is computed using the bit rate and frame rate of the input bit stream supplied from the de-encoding path section 11, the input bit stream quantizer step size, the input bitstream number of bits, the post-re-encoding number of bits supplied from the encoding path section 13, and the target average bit rate supplied from outside; and is supplied to the encoding path section 13. Here, the rate control means 14 is configured by complexity measure computing means 101, picture group quantizer step size computing means 102, quantizer step size adjusting means 103, and a quantizer step size selector 104.

In the complexity measure computing means 101, the picture group complexity measure in a plurality of pictures and the complexity measure in all pictures for which encoding was performed are computed, using the input bit stream quantizer step size and input bitstream number of bits supplied for each macro block from the de-encoding path section 11; and are supplied to the picture group quantizer step size computing means 102.

In the picture group quantizer step size computing means 102, the base quantizer step size is computed, using the frame rate supplied from the de-encoding path section 11, the target average bit rate supplied from outside, and the complexity measure and picture group complexity measure supplied from the complexity measure computing means 101; and the result of the computation is supplied to the quantizer step size adjusting means 103.

In the quantizer step size adjusting means 103, the target number of bits is set, using the input bit stream bit rate and frame rate, and input bitstream number of bits, supplied from the de-encoding path section 11, and the target average bit rate supplied from outside, the difference from the post-re-encoding number of bits supplied from the encoding path section 13 is found, adjustment of the base quantizer step size supplied from the picture group quantizer step size computing means 102 is performed according to the difference, and the adjusted quantizer step size is supplied to the quantizer step size selector 104.

In the quantizer step size selector 104, if the quantizer step size supplied from the quantizer step size adjusting means 103 is smaller than the input bit stream quantizer step size supplied from the de-encoding path section 11, the input bit stream quantizer step size is supplied to the encoding path section 13.

Operation of first Embodiment

Next, an example of the operation in the rate control means 14 of the present invention will be described. Equations (1) to (16) shown below are examples of the processing in complexity measure computation, and these equations represent examples of the processing in the complexity measure computing means 101. In this complexity measure computing means 101, the quantizer step size cumulative value $Q_{op}$, a number of bits cumulative value $S_{op}$, and complexity measure $X_p$ of a picture group in a plurality of pictures, and the quantizer step size cumulative value $Q_{ot}$, a number of bits cumulative value $S_{ot}$, and complexity measure $X_t$ in all pictures, are computed by means of equations (1) to (6), for example, using the input bit stream quantizer step size $Q_{oj}$ and input bitstream a number of bits $S_{oj}$ supplied for each macro block from the de-encoding path section 11; and the picture group complexity measure $X_p$ and complexity measure $X_t$ are supplied to the picture group quantizer step size computing means 102. Here, symbol $N_p$ denotes the number of pictures in the picture group, symbol $N_t$ denotes the total number of pictures for which encoding is performed, and symbol $N_{mb}$ denotes the number of macro blocks per picture.

$$Qop = \sum_{j=1}^{Np \times Nmb} Qoj \qquad (1)$$

$$Sop = \sum_{j=1}^{Np \times Nmb} Soj \qquad (2)$$

$$Xp = \frac{Qop \times Sop}{Np^2 \times Nmb} \qquad (3)$$

$$Qot = \sum_{j=1}^{Np \times Nmb} Qoj \qquad (4)$$

$$Sot = \sum_{j=1}^{Np \times Nmb} Soj \qquad (5)$$

$$Xt = \frac{Qot \times Sot}{Nt^2 \times Nmb} \qquad (6)$$

In the picture group quantizer step size computing means 102, the base quantizer step size Qb is computed by means of equation (7), for example, using the frame rate FR supplied from the de-encoding path section 11, the target average bit rate ABR supplied from outside, and the complexity measure Xt and picture group complexity measure Xp supplied from the complexity measure computing means 101; and is supplied to the quantizer step size adjusting means 103. Here, min (Xt, Xp) selects the minimum values of Xt and Xp. In the above described computation, long-term scene characteristics of the input bit stream, and shorter-period scene characteristics, are realized by performing a comparison of complexity measures, and selecting a small value provides control whereby a large number of bits is generated, enabling a decrease in picture quality to be suppressed.

$$Qb = \frac{\min(Xt, Xp) \times FR}{ABR} \qquad (7)$$

In the quantizer step size adjusting means 103, the picture group number of bits cumulative value Sop, picture group target number of bits Tp, and target number of bits of all pictures Tt, are computed by means of equation (2) above and equations (8) and (9) below, for example, using the input bit stream bit rate BR and frame rate FR, and input bit stream number of bits Soj, supplied from the de-encoding path section 11, and the target average bit rate ABR supplied from outside. Also, the number of bits cumulative value for all pictures Srt is computed by means of equation (10), using the post-re-encoding number of bits Srj supplied for each macro block from the encoding path section 13, and the difference VBO is found from equation (11). Moreover, adjustment of the base quantizer step size Qb supplied from the picture group quantizer step size computing means 102 is computed by means of equation (12), for example, and the quantizer step size Qm on which adjustment has been performed is supplied to the quantizer step size selector 104.

$$Tp = \frac{ABR \times Sop}{BR} \qquad (8)$$

$$Tt = \sum Tp \qquad (9)$$

$$Srt = \sum_{j=1}^{Np \times Nmb} Srj \qquad (10)$$

$$VBO = Srt - Tt \qquad (11)$$

$$Qm = \frac{Qb \times (a + VBO)}{r} \qquad (12)$$

Here, equation (9) above is the cumulative value of the picture group target number of bits Tp, and in equation (12) symbols a and r are parameters that determine the size of the control reaction for the difference of the generated number of bits corresponding to the target average bit rate.

In the quantizer step size selector 104, if the quantizer step size Qm supplied from the quantizer step size adjusting means 103 is smaller than the input bit stream quantizer step size Qj supplied from the de-encoding path section 11, the input bit stream quantizer step size Qj is supplied to the encoding path section 13.

Second Embodiment

Figure 2:
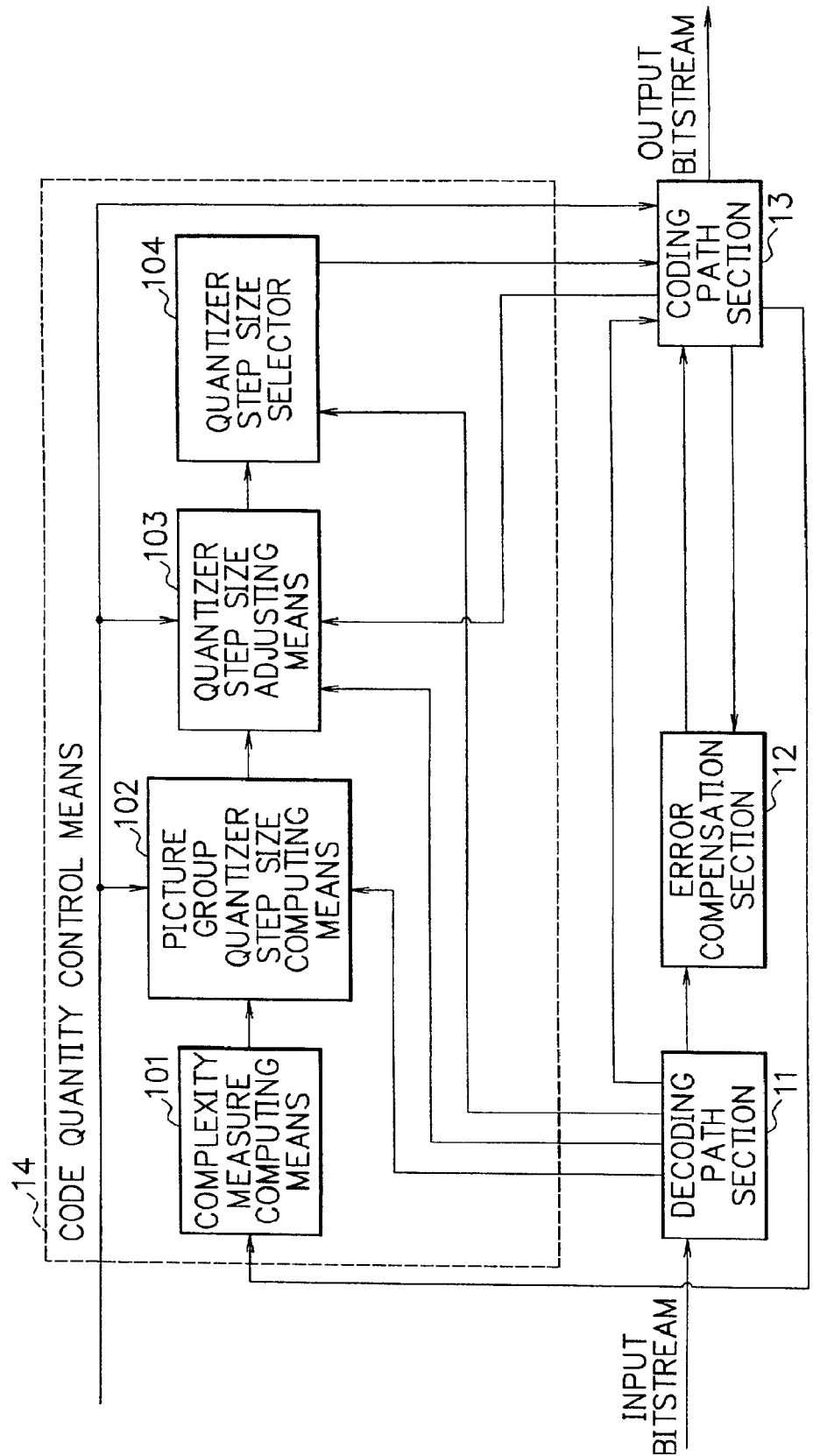
FIG. 2 is a block diagram showing a sample configuration of a compressed moving picture re-encoding apparatus according to a second embodiment.

Next, a second embodiment of the present invention is shown in FIG. 2. In the first embodiment, in the complexity measure computing means 101 the complexity measure and picture group complexity measure are computed using the input bit stream quantizer step size and input bit stream number of bits supplied from the de-encoding path section 11. According to this embodiment, in the complexity measure computing means 101 the complexity measure and picture group complexity measure are computed using the post-re-encoding quantizer step size and post-re-encoding number of bits supplied from the encoding path section 13.

Third Embodiment

Figure 3:
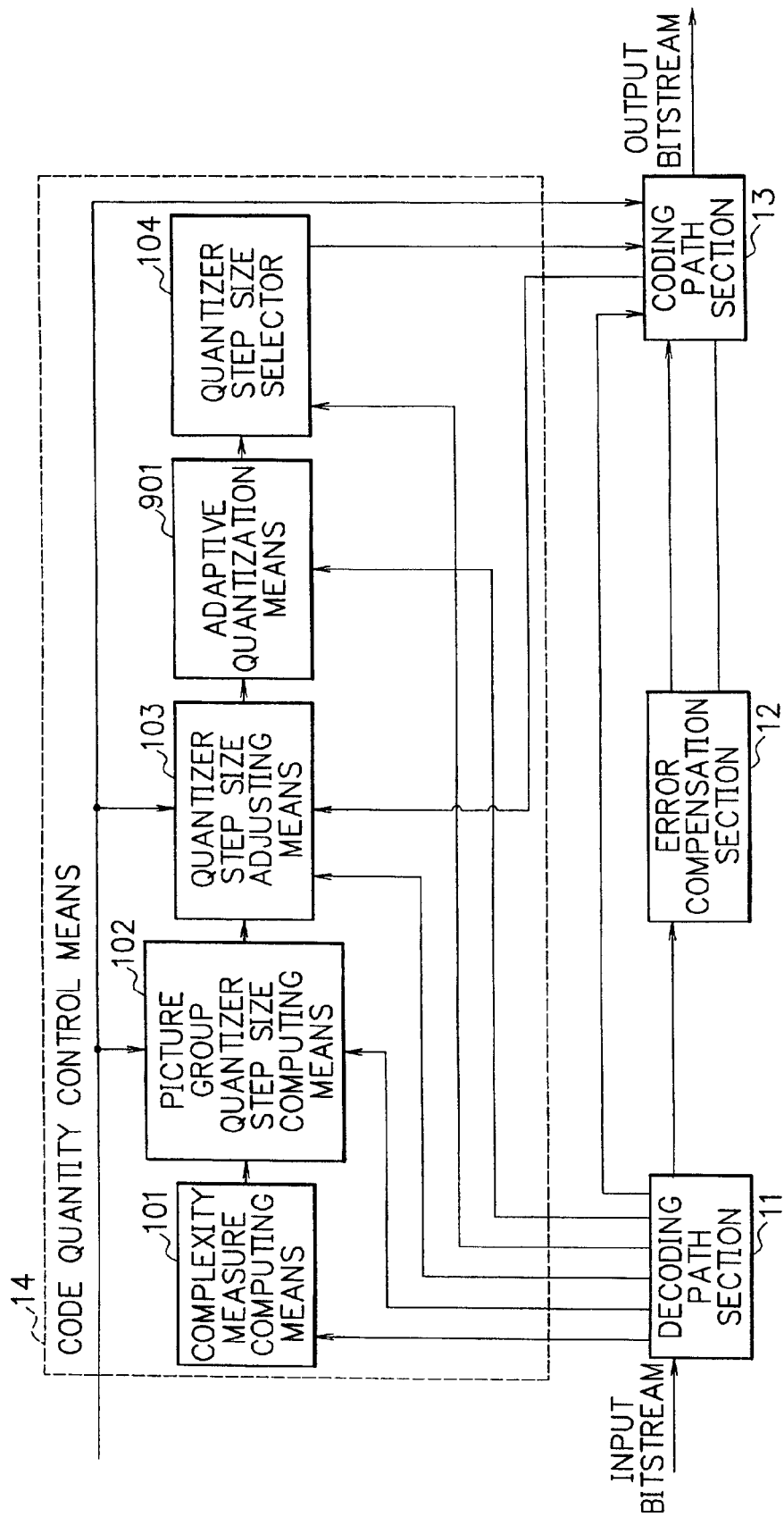
FIG. 3 is a block diagram showing a sample configuration of a compressed moving picture re-encoding apparatus according to a third embodiment.

Next, a third embodiment of the present invention is shown in FIG. 3. In the first embodiment, in the quantizer step size selector 104 quantizer step size selection is performed using the quantizer step size supplied from the quantizer step size adjusting means 103. In this embodiment, adaptive quantization means 901 is added to the block diagram shown in FIG. 1. In the adaptive quantization means 901, the quantizer step size supplied from the quantizer step size adjusting means 103 is further adjusted using the input bit stream quantizer step size and input bitstream number of bits supplied from the de-encoding path section 11, and is supplied to the quantizer step size selector 104.

Next, an example of the operation of the adaptive quantization means 901 will be described. In the adaptive quantization means 901, the quantizer step size Qa is computed by means of the picture group complexity measure Xp obtained from equation (3), and equation (13) below, for example, using the input bit stream quantizer step size Qj and a number of bits Sj supplied from the de-encoding path section 11, and the quantizer step size Qm supplied from the quantizer step size adjusting means 103, and is supplied to the quantizer step size selector 104. Here, the number of pictures in the picture group, Np, need not be the same as the number of pictures in the picture group used by the complexity measure computing means 101. In this embodiment, computation of activity performed using a normal image signal is performed using the input bit stream quantizer step size and a number of bits, and the quantizer step size is corrected. As a result, adaptive quantization that uses the properties of the image can be performed even for a compressed moving picture re-encoding apparatus with a configuration whereby de-encoding is not performed as far as the image signal level.

$$Qa = \frac{Qj \times Sj \times Qm}{Xp} \quad (13)$$

Fourth Embodiment

Figure 4:
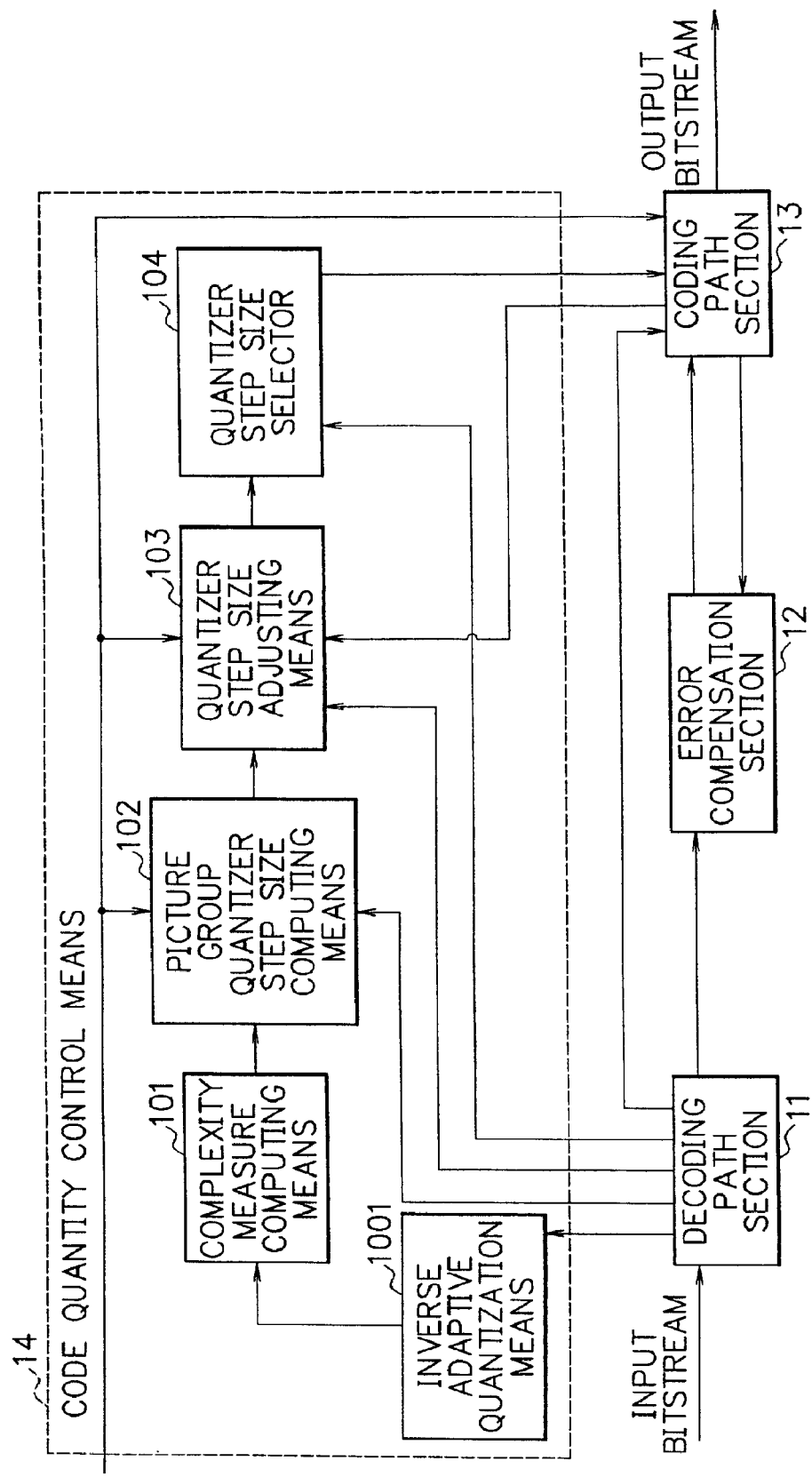
FIG. 4 is a block diagram showing a sample configuration of a compressed moving picture re-encoding apparatus according to a fourth embodiment.

Next, a fourth embodiment of the present invention is shown in FIG. 4. In the first embodiment, in the complexity measure computing means 101 the input bit stream quantizer step size is used for complexity measure computation. In this embodiment, an inverse adaptive quantizer 1001 is added to the block diagram shown in FIG. 1.

In the inverse adaptive quantizer 1001, the input bit stream quantizer step size supplied from the de-encoding path section 11 is adjusted, using the bit stream quantizer step size and input bitstream number of bits supplied from the de-encoding path section 11, and is supplied to the complexity measure computing means 101. As an example of the operation of the inverse adaptive quantization means 1001, inverse conversion of the adaptive quantization means 901 in FIG. 3 can be considered, for instance. In this embodiment, for complexity measure computation, the input bit stream quantizer step size is adjusted using the input bit stream quantizer step size and the input bit stream number of bits. As a result, it is possible to estimate the pre-adaptive-quantizer step size even for the quantizer step size of an input bit stream on which adaptive quantization is performed at the time of encoding, and complexity measure computation using the pre-adaptive-quantizer step size is made possible.

Fifth Embodiment

Figure 5:
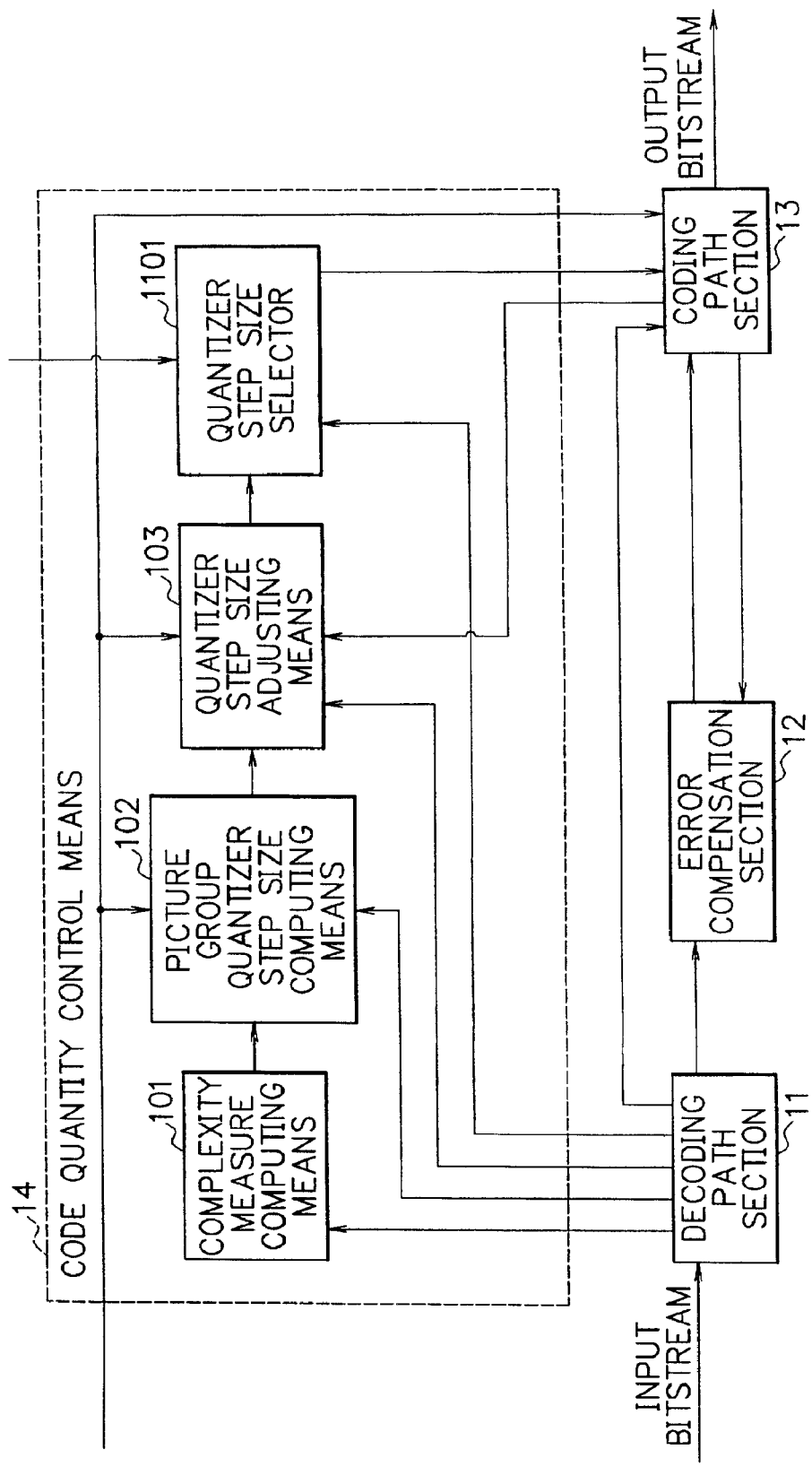
FIG. 5 is a block diagram showing a sample configuration of a compressed moving picture re-encoding apparatus according to a fifth embodiment.

Next, a fifth embodiment of the present invention is shown in FIG. 5. In this embodiment, external input for the quantizer step size selector 104 is added to FIG. 1. In the quantizer step size selector 1101 of the first embodiment, if the quantizer step size supplied from the quantizer step size adjusting means 103 is smaller than the input bit stream quantizer step size supplied from the de-encoding path section 11, the input bit stream quantizer step size is supplied to the encoding path section 13. In the quantizer step size selector 1101 of this embodiment, in addition to the above described input, the minimum quantizer step size is supplied from outside, and if the quantizer step size supplied from the quantizer step size adjusting means 103 and the input bit stream quantizer step size are smaller than the minimum quantizer step size, the minimum quantizer step size is supplied to the encoding path section 13. By this means, in this embodiment it is possible to suppress the generation of unnecessary code resulting from setting too small a quantizer step size.

Sixth Embodiment

Figure 6:
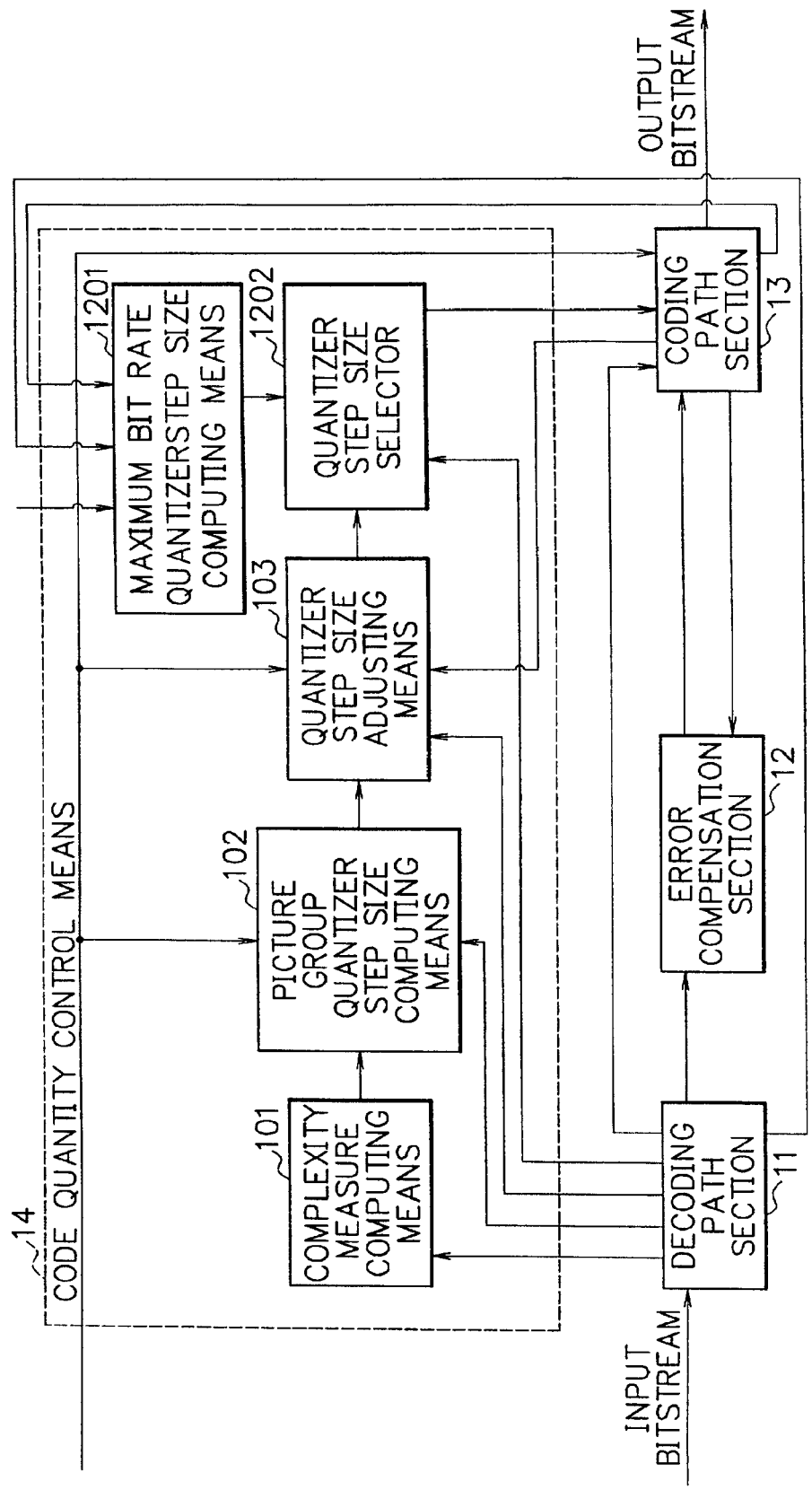
FIG. 6 is a block diagram showing a sample configuration of a compressed moving picture re-encoding apparatus according to a sixth embodiment.

Next, a sixth embodiment of the present invention is shown in FIG. 6. In this embodiment, maximum bit rate quantizer step size computing means 1201 is added to the block diagram shown in FIG. 1. In the maximum bit rate quantizer step size computing means 1201, a maximum bit rate quantizer step size is set so that the specified maximum bit rate is not exceeded, using the input bit stream quantizer step size, input bitstream number of bits, and input bit stream bit rate and frame rate, supplied from the de-encoding path section 11, the post-re-encoding quantizer step size and post-re-encoding number of bits supplied from the encoding path section 13, the maximum bit rate supplied from outside, and so forth, and is supplied to the quantizer step size selector 104.

In the quantizer step size selector 1202, in addition to the above described input, if the quantizer step size supplied from the quantizer step size adjusting means 103 using the maximum bit rate quantizer step size supplied from the maximum bit rate quantizer step size computing means 1201 and the input bit stream quantizer step size are smaller than the maximum bit rate quantizer step size, the maximum bit rate quantizer step size is supplied to the encoding path section 13. Here, computation of the maximum bit rate quantizer step size in the maximum bit rate quantizer step size computing means 1201 can be implemented, for example, by setting the target number of bits using the ratio of the input bit stream bit rate to the maximum bit rate and the number of bits of the input bitstream, and computing the macro block unit quantizer step size using rate control that meets the target number of bits. In this embodiment, if the bit rate of the input bit stream is extremely high, and the target average bit rate is low, it is possible to suppress the generation of unnecessary code resulting from setting a smaller than necessary encoding width.

Seventh Embodiment

Figure 7:
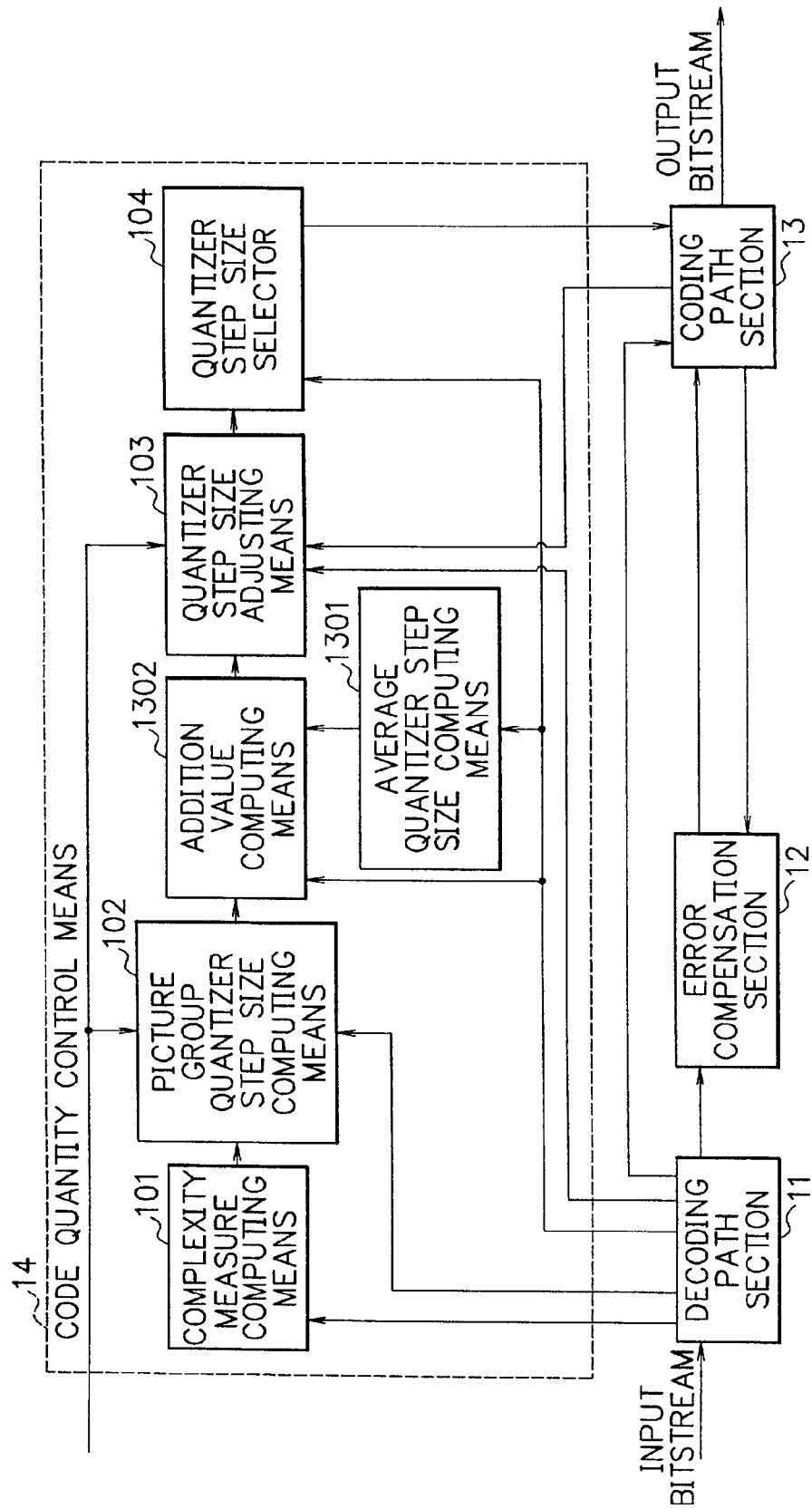
FIG. 7 is a block diagram showing a sample configuration of a compressed moving picture re-encoding apparatus according to a seventh embodiment.

Next, a seventh embodiment of the present invention is shown in FIG. 7. In this embodiment, the rate control means 14 is configured by complexity measure computing means 101, picture group quantizer step size computing means 102, quantizer step size adjusting means 103, a quantizer step size selector 104, average quantizer step size computing means 1301, and addition value computing means 1302.

Only the parts that differ from the first embodiment will now be described below. In the average quantizer step size computing means 1301, the input bit stream quantizer step sizes supplied from the de-encoding path section 11 are accumulated for a plurality of picture periods, and the average value is supplied to the addition value computing means 1302.

In the addition value computing means 1302, the difference between the base quantizer step size supplied from the picture group quantizer step size computing means 102 and the average quantizer step size supplied from the average quantizer step size computing means 1301 is added to the input bit stream quantizer step size supplied from the de-encoding path section 11, and is supplied to the quantizer step size adjusting means 103.

Next, an example of the operation of the average quantizer step size computing means 1301 and addition value computing means 1302 will be shown. In the average quantizer step size computing means 1301, the average quantizer step size Qave is computed by means of equation (1) above and equation (14) below, using the quantizer step size Qj supplied from the de-encoding path section 11, and is supplied to the addition value computing means 1302. Here, the number of pictures in the picture group, Np, need not be the same as the number of pictures in the picture group used by the complexity measure computing means 101.

$$Qave = \frac{Qop}{Np} \quad (14)$$

In the addition value computing means 1302, the addition value A is computed by means of equation (15) below, for example, using the quantizer step size Qb supplied from the picture group quantizer step size computing means 102 and the average quantizer step size Qave supplied from the average quantizer step size computing means 1301, and is supplied to the quantizer step size adjusting means 103. Thus, in this embodiment, as an addition value is added to the input bit stream quantizer step size, if the quantizer step size has been set using adaptive quantization at the time of encoding, the quantizer step size can be set without considering adaptive quantization.

$$\begin{cases} \text{If } Qb - Qave > 0, & \text{then } A = Qb - Qave \\ & \text{else } A = 0 \end{cases} \quad (15)$$

Eighth Embodiment

Figure 8:
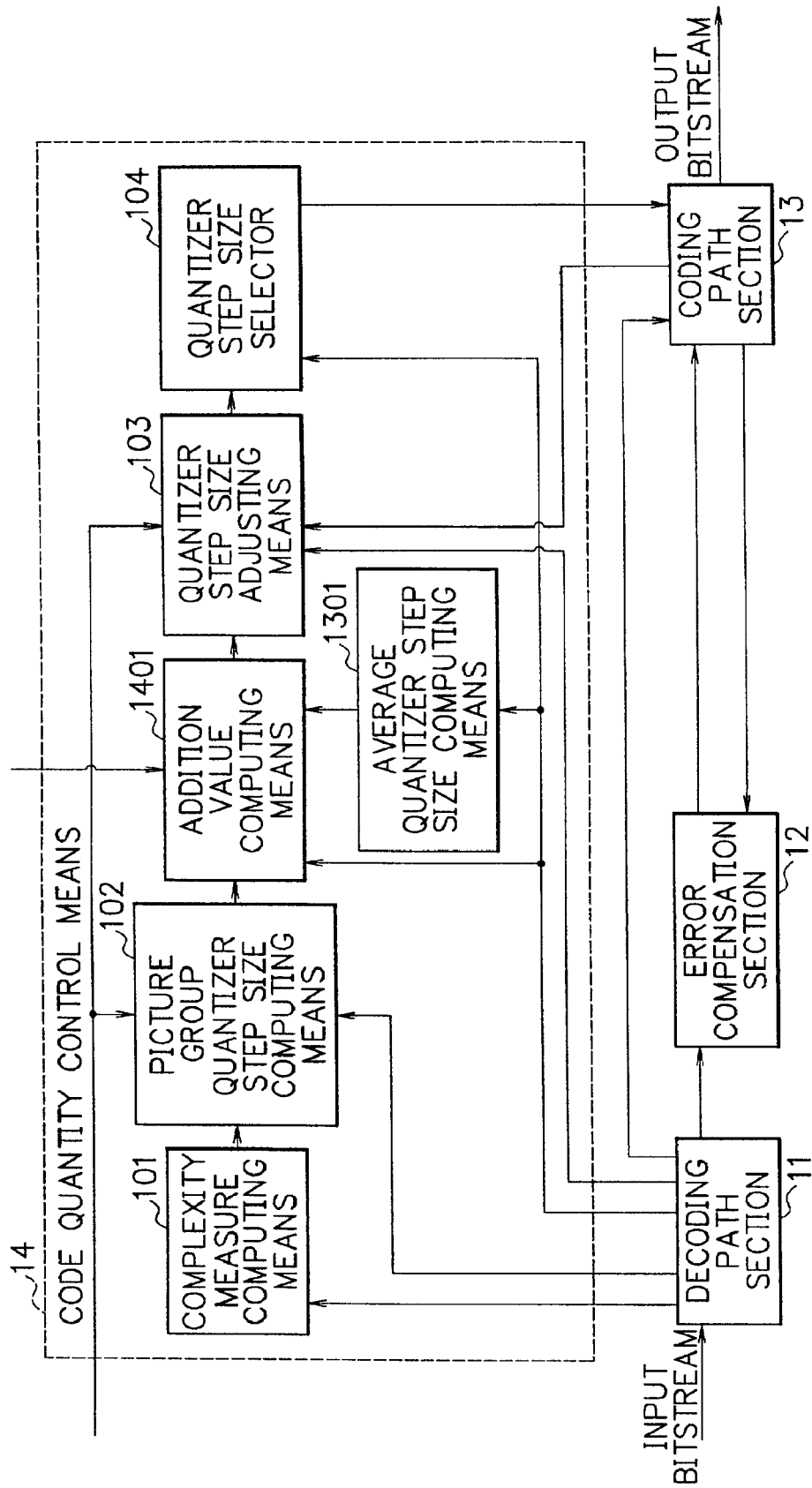
FIG. 8 is a block diagram showing a sample configuration of a compressed moving picture re-encoding apparatus according to an eighth embodiment.

Next, an eighth embodiment of the present invention is shown in FIG. 8. In this embodiment, external input to the addition value computing means 1302 is added to FIG. 7. In the addition value computing means 1302 of the seventh embodiment, the difference between the base quantizer step size supplied from the picture group quantizer step size computing means 102 and the average quantizer step size supplied from the average quantizer step size computing means 1301 is added to the input bit stream quantizer step size supplied from the deencoding path section 11, and the quantizer step size is computed.

In the addition value computing means 1401 of this embodiment, in addition to the above described input, a minimum quantizer step size or threshold value is supplied from outside. In the addition value computing means 1401, quantizer step size selection is performed by comparing the computed quantizer step size with the quantizer step size or threshold value, and the quantizer step size is supplied to the quantizer step size adjusting means 103.

Figure 9:
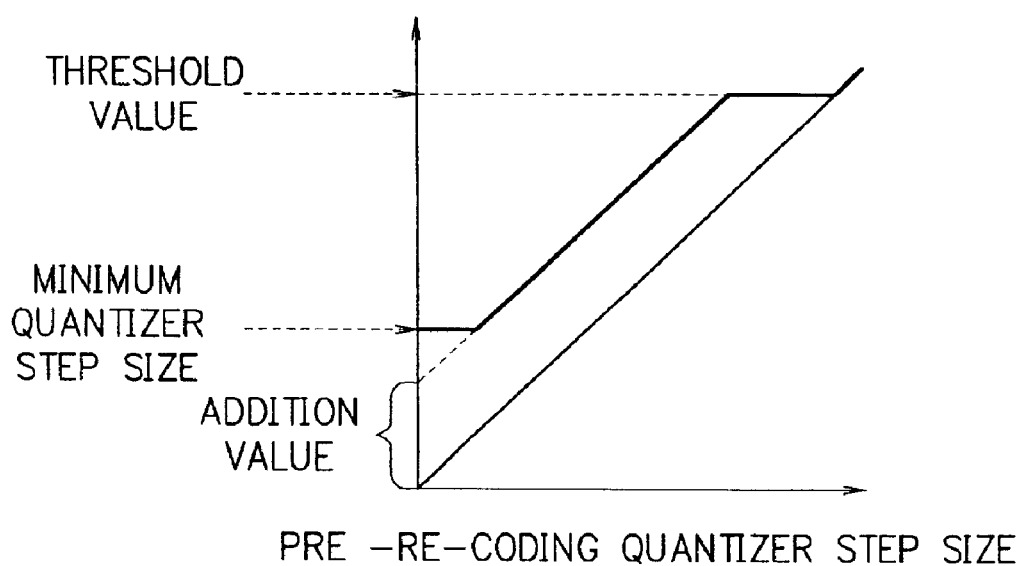
FIG. 9 is an explanatory graph of sample operation of quantizer step size setting means according to the eighth embodiment.

An example of the operation of the addition value computing means is shown in FIG. 9. FIG. 9 shows which quantizer step size is selected when a minimum quantizer step size and threshold value have been set. The horizontal axis represents the input bit stream quantizer step size, and the vertical axis represents the post-re-encoding quantizer step size. The bold line in the graph is the quantizer step size selected by means of this quantizer step size setting.

Here, the minimum value of the quantizer step size is set according to the minimum quantizer step size, and from a certain quantizer step size onward according to the threshold value, a quantizer step size is set so that the post-re-encoding quantizer step size does not exceed the threshold value until the input bit stream quantizer step size exceeds the threshold value. By this means, in this embodiment the generation of an excessive the number of bits is suppressed by setting the minimum value of the post-re-quantization quantizer step size. Also, selection of a quantizer step size greater than the threshold value is prevented, and deterioration of the picture quality is suppressed.

Ninth Embodiment

Next, a ninth embodiment of the present invention will be described. In the seventh and eighth embodiments, the same addition value is added to the input bit stream quantizer step size regardless of the encoding prediction method. In the ninth embodiment, an addition value is held for each picture encoding prediction method. For example, for MPEG-2 intra-frame encoding (I-picture), forward inter-frame encoding (P-picture), and bidirectional inter-frame encoding (B-picture), an average quantizer step size Qave same as seventh Embodiment is computed for each encoding mode by the average quantizer step size computing means 1301, and is supplied to the addition value computing means 1302.

In the addition value computing means 1302, the difference between the base quantizer step size supplied from the picture group quantizer step size computing means 102 and the average quantizer step size for each encoding mode supplied from the average quantizer step size computing means 1301 is computed, and is added to the input bit stream quantizer step size supplied from the de-encoding path section 11 for each encoding mode, and quantizer step size computation is performed. Thus, in this embodiment, as the addition value is switched according to the encoding mode, finer control is possible than with a single addition value, and the picture quality can be improved.

Operation of Embodiments

Figure 10:
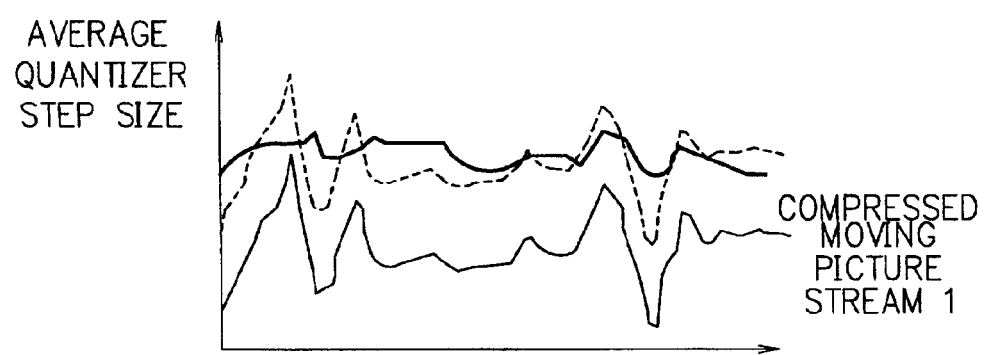
FIG. 10 is an explanatory graph of the principle.
Figure 11:
FIG. 11 is an explanatory graph of the principle.
Figure 13:
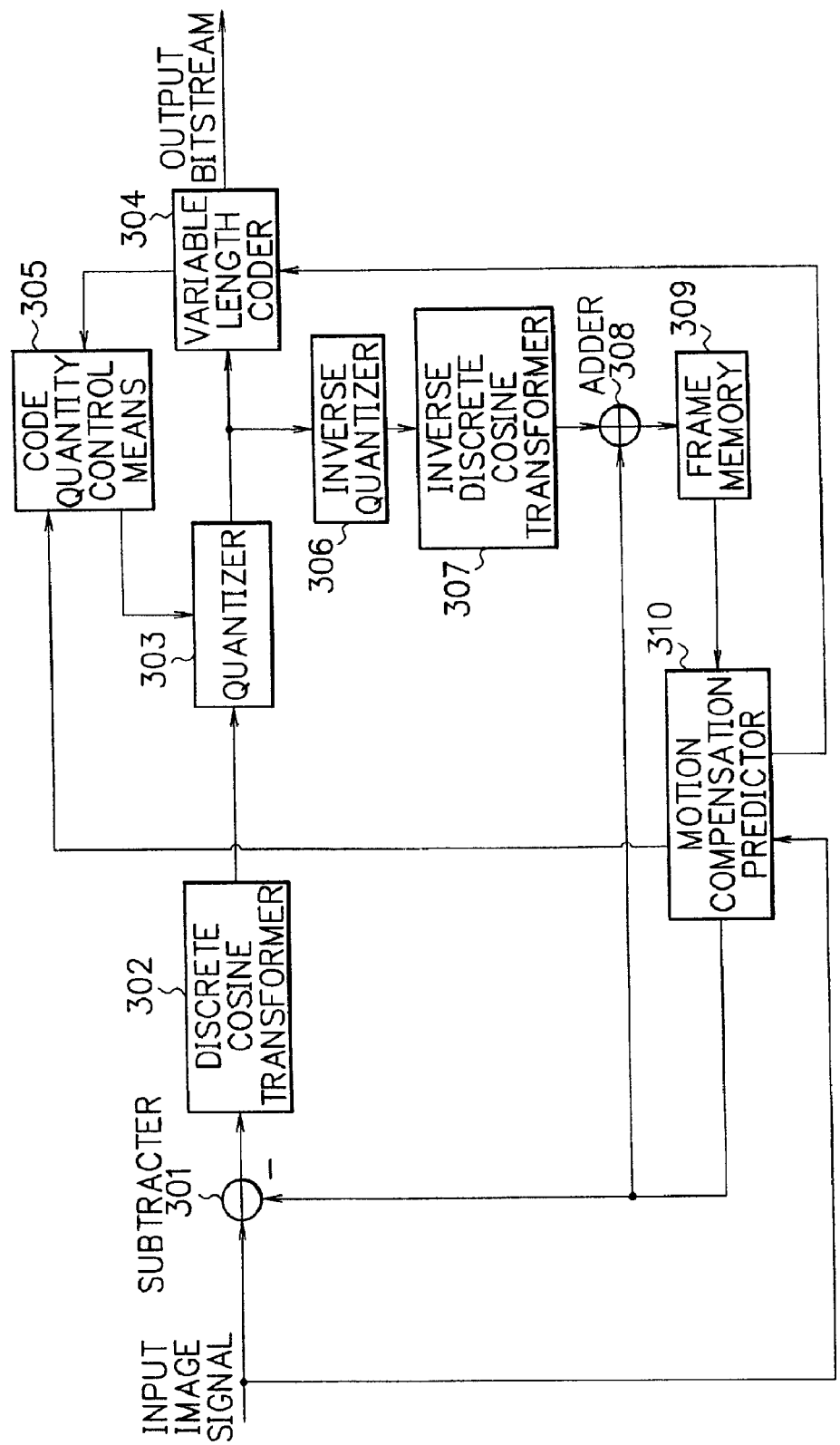
FIG. 13 is a block diagram showing the configuration of a coder according to the prior art.
Figure 15:
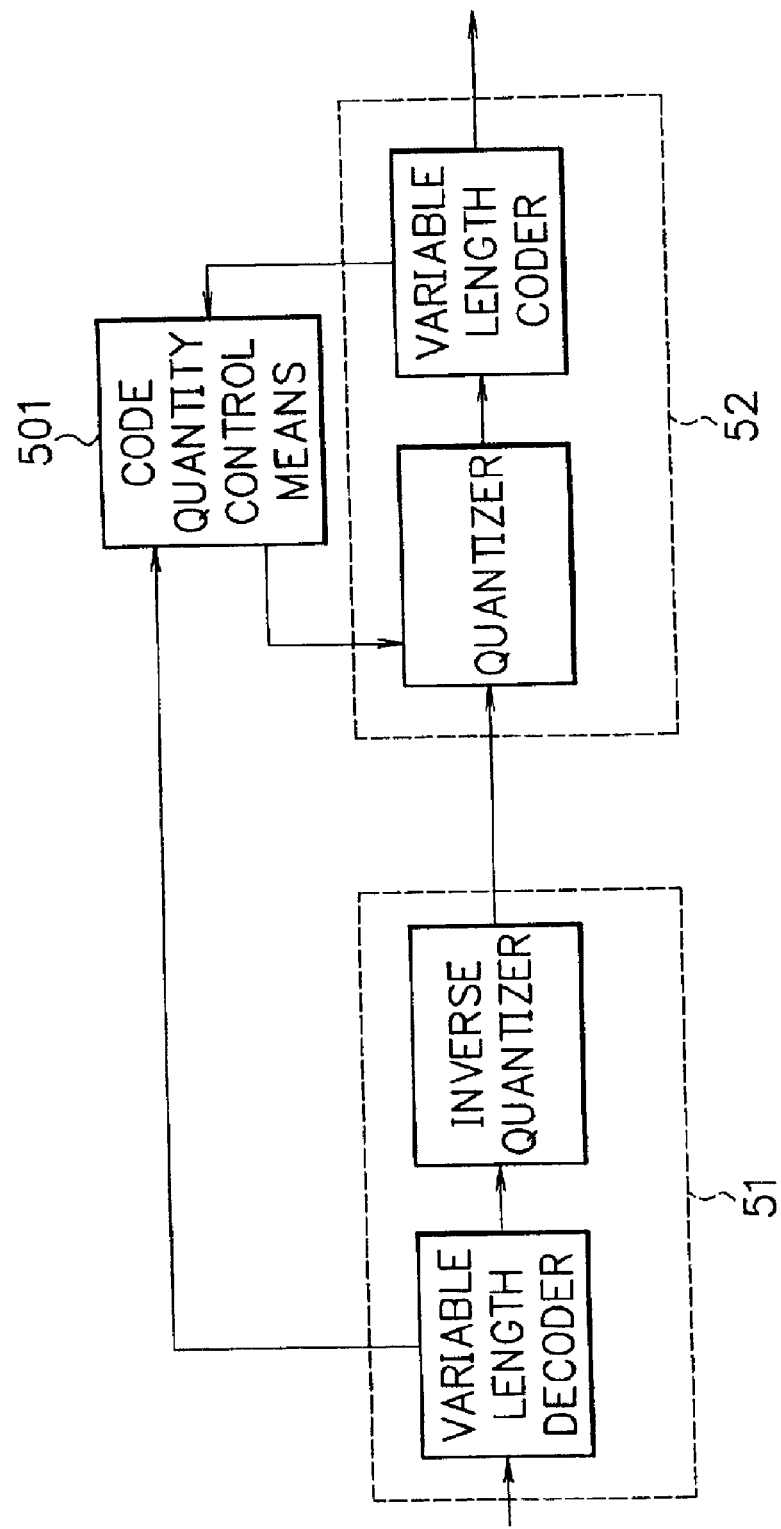
FIG. 15 is a block diagram showing a sample configuration of a compressed moving picture re-encoding apparatus according to the prior art.

In the above described all embodiments, the situation where, for example, compressed moving picture stream 1, which is the input, is re-enencoded, and compressed moving picture stream 2 is output, is considered. FIG. 10 shows the relationship between the average quantizer step size and time per picture in compressed moving picture stream 1 and post-re-encoding compressed moving picture stream 2, and FIG. 11 shows an example of the relationship between the generated the number of bits and time at this time. The thin solid line in FIG. 10 and FIG. 11 represents compressed moving picture stream 1.

In general, a reduction of the number of bits can be achieved by setting a larger quantizer step size than the quantizer step size in compressed moving picture stream 1 and performing re-quantization. With conventional methods, the target number of bits at the time of re-encoding is set according to the number of bits of compressed moving picture stream 1, and the quantizer step size is set. In a case such as that shown in FIG. 11, for example, since a virtually defined number of bits must be reduced in any period, the quantizer step sizes are uniformly set as large values. As a result, as shown by the dashed line in FIG. 10, even for a picture with a large input compressed moving picture stream quantizer step size and poor picture quality, an even larger value is set at the time of re-encoding, causing a deterioration in picture quality. This kind of problem can be solved by setting the quantizer step size according to the moving picture scene characteristics, as shown by the bold line in FIG. 10. In the present invention, the moving picture scene characteristics are found using encoding information contained in the input compressed moving picture stream, and the quantizer step size is set according to the characteristics.

Next, correction is performed for the set quantizer step size, using the difference between the target number of bits found using the average bit rate, etc., and the actual number of bits. As a result, control can be achieved whereby the picture quality is constant for a given period, the average bit rate is attained, and the target number of bits is approached. Also, by ensuring that the quantizer step size does not become smaller than the quantizer step size of the input compressed moving picture stream, a more balanced improvement in picture quality can be achieved, without allocating unnecessarily large code quantities. With the present invention, moreover, since the entire compressed moving picture stream is once de-encoded, and re-encoding is performed without finding the moving picture characteristics, it is possible to implement real-time processing with little delay.

The above described embodiments are examples of the preferred embodiments of the present invention. However, the present invention is not limited to the above described embodiments, and various embodiments are possible within the scope of the essentials of the present invention.

As is apparent from the above description, in a compressed moving picture re-encoding apparatus and compressed moving picture re-encoding method according to the present invention, a quantizer step size that is used in re-encoding is computed, the computed quantizer step size and the quantizer step size in the input compressed moving picture stream are input, and the quantizer step size that is used in actual re-encoding is output. Thus, by finding the moving picture scene characteristics using encoding information contained in the input compressed moving picture stream, performing quantizer step size setting according to the characteristics, and performing correction for the set quantizer step size using the difference between the target number of bits and the actual number of bits, and control can be achieved whereby the picture quality is constant for a given period, the average bit rate is attained, and the target number of bits is approached. By this means, high-picture-quality re-encoding can be achieved. Also, since the entire compressed moving picture stream is once deenencoded, and re-encoding is performed without finding the moving picture characteristics, it is possible to achieve compressed moving picture stream re-encoding with little delay and in real time.

What is claimed is:

1. A compressed moving picture re-encoding apparatus comprising:

means to receive an input compressed moving picture stream, generated by a compression-encoding of moving picture data, as an input signal;

means for receiving said a pre-set average bit rate;

means for computing a quantizer step size that is to be in a re-encoding of said input compressed moving picture stream that would have said pre-set average bit rate;

means for inputting said computed quantizer step size and a quantizer step size in said input compressed moving picture stream and outputting a quantizer step size that is used in actual re-encoding;

means to perform said re-encoding at said pre-set average bit rate and at a variable bit rate; and means to output said compressed moving picture stream whose bit rate has been changed.

2. A compressed moving picture re-encoding apparatus comprising:

means to receive an input compressed moving picture stream, generated by a compression-encoding of moving picture data, as an input signal;

means for receiving said a pre-set average bit rate;

means for computing a quantizer step size that is used in a re-encoding of said input compressed moving picture stream that would have said pre-set average bit rate;

means for inputting said computed quantizer step size and a quantizer step size in said input compressed moving picture stream and outputting a quantizer step size that is used in actual re-encoding;

means for selecting a larger quantizer step size from said quantizer step size that is used in re-encoding and said quantizer step size in the input compressed moving picture stream;

means to perform said re-encoding at said pre-set average bit rate and at variable bit rate; and means to output said compressed moving picture stream whose bit rate has been changed.

3. A compressed moving picture re-encoding apparatus comprising:

means to receive an input compressed moving picture stream, generated by a compression-encoding of moving picture data, as an input signal;

means for receiving a pre-set average bit rate;

means for computing a quantizer step size that is used in said re-encoding;

means for inputting said computed quantizer step size and a quantizer step size in said input compressed moving picture stream and outputting a quantizer step size that is used in actual re-encoding;

means for applying weighting, according to image characteristics, to the quantizer step size that is used in said re-encoding, and adjusting that quantizer step size;

means to perform said re-encoding at said pre-set average bit rate and at a variable bit rate; and means to output said compressed moving picture stream whose bit rate has been changed.

4. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for applying weighting, according to image characteristics, to the quantizer step size that is used in said re-encoding, and adjusting that quantizer step size; and means for computing a ratio of a complexity measure in a prescribed period or number of pictures to a complexity measure of an object of re-encoding, using either or both of the quantizer step size and a number of bits of said input compressed moving picture stream, performing weighting of said quantizer step size, and adjusting that quantizer step size.

5. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding; and means for computing respective complexity measures in two or more kinds of prescribed periods or numbers of pictures, using either or both of the quantizer step size and the number of bits of said input compressed moving picture stream.

6. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing respective complexity measures in two or more kinds of prescribed periods or numbers of pictures, using either or both of the quantizer step size and a number of bits of said input compressed moving picture stream;

means for outputting a prescribed complexity measure from said complexity measures;

means for computing the quantizer step size using said pre-set average bit rate and said output complexity measure;

means for computing an average of respective quantizer step sizes every prescribed period or number of pictures, according to an encoding prediction mode of said input compressed moving picture stream, using the quantizer step size of said input compressed moving picture stream; and means for computing an addition value for each encoding prediction mode, using said quantizer step size and said average quantizer step size, and computing an addition quantizer step size in which an addition value has been added to said input compressed moving picture stream quantizer step size, wherein said addition quantizer step size is adjusted every prescribed period according to the difference (excess or deficiency) between a target number of bits and an actual number of bits, to give the quantizer step size that is used in re-encoding.

7. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing, by using a maximum bit rate among set bit rates and either or both of the quantizer step size and a number of bits of said input compressed moving picture stream, the maximum bit rate quantizer step size at said maximum bit rate; and means for taking said maximum bit rate quantizer step size and the quantizer step size that is used in said re-encoding as input, and outputting the quantizer step size that is used in re-encoding.

8. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing respective complexity measures in two or more kinds of prescribed predetermined periods or numbers of pictures, using either or both of the quantizer step size and a number of bits in either of said input compressed moving picture stream or a re-encoded compressed moving picture stream; and means for outputting a prescribed complexity measure from said complexity measures.

9. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures; and means for computing the quantizer step size using said pre-set average bit rate and said output complexity measure, wherein said quantizer step size is adjusted every prescribed period according to a difference between a target number of bits and an actual number of bits, to give the quantizer step size that is used in said re-encoding.

10. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for selecting a larger quantizer step size from said quantizer step size that is used in re-encoding and said quantizer step size in the input compressed moving picture stream;

means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures; and means for computing said quantizer step size using said pre-set average bit rate and said output complexity measure;

wherein said quantizer step size is adjusted every prescribed period according to a difference between a target number of bits and an actual number of bits, to give the quantizer step size that is used in said re-encoding.

11. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

said re-encoding;
means for inputting said computed quantizer step size and a quantizer step size in said input compressed moving picture stream and outputting a quantizer step size that is used in actual re-encoding;
means for computing respective complexity measures in two or more kinds of prescribed predetermined periods or numbers of pictures, using either or both of the quantizer step size and a number of bits in either of said input compressed moving picture stream or a re-encoded compressed moving picture stream;
means for outputting a prescribed complexity measure from a plurality of said complexity measures; and
means for computing the quantizer step size using said pre-set average bit rate and said output complexity measure,
wherein said quantizer step size is adjusted every prescribed period according to a difference between a target number of bits and an actual number of bits, to give the quantizer step size that is used in said re-encoding, and
pictures from a picture re-encoded at a start of re-encoding to a picture immediately preceding that for which re-encoding is currently being performed, or a plurality of pictures including one image encoded within a frame, are used as a plurality of pictures used as said prescribed period or number of pictures.

12. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;
means for inputting said computed quantizer step size and a quantizer step size in said input compressed moving picture stream and outputting a quantizer step size that is used in actual re-encoding;
means for computing respective complexity measures in two or more kinds of prescribed predetermined periods or numbers of pictures, using either or both of the quantizer step size and a number of bits in either of said input compressed moving picture stream or a re-enencoded compressed moving picture stream;
means for outputting a prescribed complexity measure from a plurality of said complexity measures; and
means for computing said quantizer step size using said pre-set average bit rate and said output complexity measure,
wherein said quantizer step size is adjusted every prescribed period according to a difference between a target number of bits and an actual number of bits, to give the quantizer step size that is used in said recording, and
pictures from a picture re-encoded at a start of re-encoding to a picture immediately preceding that for which re-encoding is currently being performed, or a plurality of pictures including one image re-encoded within a frame, are used as a plurality of pictures used as said prescribed period or number of pictures.

13. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;
means for inputting said computed quantizer step size and a quantizer step size in said input compressed moving picture stream and outputting a quantizer step size that is used in actual re-encoding;
means for computing respective complexity measures in two or more kinds of prescribed predetermined periods or numbers of pictures, using either or both of the quantizer step size and a number of bits in either of said input compressed moving picture stream or a re-encoded compressed moving picture stream;
means for outputting a prescribed complexity measure from a plurality of said complexity measures; and
means for computing said quantizer step size using said pre-set average bit rate and said output complexity measure,
wherein said quantizer step size is adjusted every prescribed period according to a difference between a target number of bits and an actual number of bits, to give the quantizer step size that is used in said re-encoding, and
a group of blocks into which a picture is divided is used for said prescribed period for adjusting a base quantizer step size according to excess or deficiency with respect to said target number of bits.

14. A compressed moving picture re-encoding apparatus that has an input compressed moving picture stream, generated by a compression-encoding of moving picture data, as an input signal, performs re-encoding at a pre-set average bit rate and at a variable bit rate, and, has an output compressed moving picture stream whose bit rate has been changed as an output signal, said compressed moving picture re-encoding apparatus comprising:

means for computing a quantizer step size that is used in said re-encoding;
means for inputting said computed quantizer step size and a quantizer step size in said input compressed moving picture stream and outputting a quantizer step size that is used in actual re-encoding;
means for selecting a larger quantizer step size from said quantizer step size that is used in re-encoding and said quantizer step size in the input compressed moving picture stream;
means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures; and means for computing said quantizer step size using said pre-set average bit rate and said output complexity measure, wherein said quantizer step size is adjusted every prescribed period according to a difference between a target number of bits and an actual number of bits, to give the quantizer step size that is used in said re-encoding, and a group of blocks into which a picture is divided is used for said prescribed period for adjusting a base quantizer step size according to excess or deficiency with respect to said target number of bits.

15. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for selecting a larger quantizer step size from said quantizer step size that is used in re-encoding and said quantizer step size in the input compressed moving picture stream;

means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures; and means for computing said quantizer step size using said pre-set average bit rate and said output complexity measure, wherein said quantizer step size is adjusted every prescribed period according to a difference between a target number of bits and an actual number of bits, to give the quantizer step size that is used in said re-encoding, wherein a group of blocks into which a picture is divided is used for said prescribed period for adjusting a base quantizer step size according to excess or deficiency with respect to said target number of bits and pictures from a picture re-encoded at a start of re-encoding to a picture immediately preceding that for which re-encoding is currently being performed, or a plurality of pictures including one image encoded within a frame, are used as a plurality of pictures used as said prescribed period or number of pictures.

16. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures; and means for computing said quantizer step size using said pre-set average bit rate and said output complexity measure, wherein said quantizer step size is adjusted every prescribed period according to a difference between a target number of bits and an actual number of bits, to give the quantizer step size that is used in said re-encoding, a group of blocks into which a picture is divided is used for said prescribed period for adjusting a base quantizer step size according to excess or deficiency with respect to said target number of bits, and pictures from a picture re-encoded at a start of re-encoding to a picture immediately preceding that for which re-encoding is currently being performed, or a plurality of pictures including one image re-encoded within a frame, are used as a plurality of pictures used as said prescribed period or number of pictures.

17. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures;

means for computing said quantizer step size using said pre-set average bit rate and said output complexity measure, wherein said quantizer step size is adjusted every prescribed period according to the difference between the target number of bits and the actual number of bits, to give the quantizer step size that is used in said re-encoding; and means for selecting a minimum complexity measure among said plurality of complexity measures.

18. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for selecting a larger quantizer step size from said quantizer step size that is used in re-encoding and said quantizer step size in the input compressed moving picture stream;

means for computing respective complexity measures in two or more kinds of prescribed predetermined periods or numbers of pictures, using either or both of the quantizer step size and a number of bits in either of said input compressed moving picture stream or a re-encoded compressed moving picture stream;

means for outputting a prescribed complexity measure from a plurality of said complexity measures;

means for computing said quantizer step size using said pre-set average bit rate and said output complexity measure, wherein said quantizer step size is adjusted every prescribed period according to the difference between the target number of bits and the actual number of bits, to give the quantizer step size that is used in said re-encoding; and means for selecting a minimum complexity measure among said plurality of complexity measures.

19. A compressed moving picture re-encoding apparatus that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for selecting a larger quantizer step size from said quantizer step size that is used in re-encoding and said quantizer step size in the input compressed moving picture stream;

means for computing respective complexity measures in two or more kinds of prescribed predetermined periods or numbers of pictures, using either or both of the quantizer step size and a number of bits in either of said input compressed moving picture stream or a re-encoded compressed moving picture stream, wherein pictures from a picture re-encoded at the start of re-encoding to a picture immediately preceding that for which re-encoding is currently being performed, or a plurality of pictures including one image encoded within a frame, are used as a plurality of pictures used as said prescribed period or number of pictures;

means for outputting a prescribed complexity measure from a plurality of said complexity measures;

means for computing said quantizer step size using said pre-set average bit rate and said output complexity measure, wherein said quantizer step size is adjusted every prescribed period according to the difference between the target number of bits and the actual number of bits, to give the quantizer step size that is used in said re-encoding; and means for selecting a minimum complexity measure among said plurality of complexity measures.

20. The compressed moving picture re-encoding apparatus according to claim 9, further comprising:

means for applying weighting, according to image characteristics, to the quantizer step size of said input compressed moving picture stream used in said complexity measure computation, and adjusting that quantizer step size.

21. The compressed moving picture re-encoding apparatus according to claim 10, further comprising:

means for applying weighting, according to image characteristics, to the quantizer step size of said input compressed moving picture stream used in said complexity measure computation, and adjusting that quantizer step size.

22. The compressed moving picture re-encoding apparatus according to claim 11, further comprising:

means for applying weighting, according to image characteristics, to the quantizer step size of said input compressed moving picture stream used in said complexity measure computation, and adjusting that quantizer step size.

23. The compressed moving picture re-encoding apparatus according to claim 12, further comprising:

means for applying weighting, according to image characteristics, to the quantizer step size of said input compressed moving picture stream used in said complexity measure computation, and adjusting that quantizer step size.

24. The compressed moving picture re-encoding apparatus according to claim 13, further comprising:

means for applying weighting, according to image characteristics, to the quantizer step size of said input compressed moving picture stream used in said complexity measure computation, and adjusting that quantizer step size.

25. The compressed moving picture re-encoding apparatus according to claim 14, further comprising:

means for applying weighting, according to image characteristics, to the quantizer step size of said input compressed moving picture stream used in said complexity measure computation, and adjusting that quantizer step size.

26. The compressed moving picture re-encoding apparatus according to claim 15, further comprising:

means for applying weighting, according to image characteristics, to the quantizer step size of said input compressed moving picture stream used in said complexity measure computation, and adjusting that quantizer step size.

27. The compressed moving picture re-encoding apparatus according to claim 16, further comprising:

means for applying weighting, according to image characteristics, to the quantizer step size of said input compressed moving picture stream used in said complexity measure computation, and adjusting that quantizer step size.

28. The compressed moving picture re-encoding apparatus according to claim 17, further comprising:

means for applying weighting, according to image characteristics, to the quantizer step size of said input compressed moving picture stream used in said complexity measure computation, and adjusting that quantizer step size.

29. The compressed moving picture re-encoding apparatus according to claim 18, further comprising:

means for applying weighting, according to image characteristics, to the quantizer step size of said input compressed moving picture stream used in said complexity measure computation, and adjusting that quantizer step size.

30. The compressed moving picture re-encoding apparatus according to claim 19, further comprising:

means for applying weighting, according to image characteristics, to the quantizer step size of said input compressed moving picture stream used in said complexity measure computation, and adjusting that quantizer step size.

31. The compressed moving picture re-encoding apparatus according to claim 9, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to complexity measure of an object of re-encoding, using either or both of the quantizer step size and the number of bits of said input compressed moving picture stream, performing weighting of said quantizer step size, and adjusting that quantizer step size.

32. The compressed moving picture re-encoding apparatus according to claim 10, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

33. The compressed moving picture re-encoding apparatus according to claim 11, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

34. The compressed moving picture re-encoding apparatus according to claim 12, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

35. The compressed moving picture re-encoding apparatus according to claim 13, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and a number of bits of said input compressed moving picture stream, performing weighting of said quantizer step size, and adjusting that quantizer step size.

36. The compressed moving picture re-encoding apparatus according to claim 14, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

37. The compressed moving picture re-encoding apparatus according to claim 15, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

38. The compressed moving picture re-encoding apparatus according to claim 16, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

39. The compressed moving picture re-encoding apparatus according to claim 17, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

40. The compressed moving picture re-encoding apparatus according to claim 18, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

41. The compressed moving picture re-encoding apparatus according to claim 19, further comprising:

means for applying weighting, according to image characteristics, to the quantizer step size of said input compressed moving picture stream used in said complexity measure computation, and adjusting that quantizer step size; and means for computing a ratio of respective complexity measures in a prescribed period or number of pictures to a complexity measure of an object of re-encoding, using either or both of the quantizer step size and the number of bits of said input compressed moving picture stream, performing weighting of said quantizer step size, and adjusting that quantizer step size.

42. The compressed moving picture re-encoding apparatus according to claim 7, wherein a threshold setting is made for a prescribed plurality of quantizer step sizes with respect to an addition quantizer step size.

43. A compressed moving picture re-encoding apparatus that has an input compressed moving picture stream, generated by a compression encoding of moving picture data, as an input signal, performs re-encoding at a pre-set average bit rate and at a variable bit rate, and has an output compressed moving picture stream whose bit rate has been changed as an output signal, said compressed moving picture re-encoding apparatus comprising:

means for computing a quantizer step size that is used in said re-encoding;

means for inputting said computed quantizer step size and a quantizer step size in said input compressed moving picture stream and outputting a quantizer step size that is used in actual re-encoding;

means for computing, by using a maximum bit rate among set bit rates and either or both of the quantizer step size and a number of bits of said input compressed moving picture stream, a maximum bit rate quantizer step size at said maximum bit rate; and means for taking said maximum bit rate quantizer step size and the quantizer step size that is used in said re-encoding as input, and outputting the quantizer step size that is used in re-encoding, said means for computing the maximum bit rate quantizer step size comprises a rate control that satisfies a ratio of an input bit stream bit rate to said maximum bit rate with respect to a number of bits in a prescribed period or number of pictures of said input compressed moving picture stream.

44. The compressed moving picture re-encoding apparatus according to claim 1, wherein a minimum value is set for said quantizer step size that is used in re-encoding.

45. A compressed moving picture re-encoding method comprising:

receiving a value for a pre-set average bit rate at which a compressed moving picture stream is to be re-encoded;

receiving a compressed moving picture stream that has been generated by a compression-encoding of moving picture data;

computing a quantizer step size that is used in said re-encoding;

inputting said computed quantizer step size and a quantizer step size in said input compressed moving picture stream and outputting a quantizer step size that is used in actual re-encoding;

performing a re-encoding of said compressed moving picture stream at said received pre-set average bit rate; and outputting said re-encoded compressed moving picture stream.

46. A compressed moving picture re-encoding method comprising:

receiving a value for a pre-set average bit rate at which a compressed moving picture stream is to be re-encoded;

receiving a compressed moving picture stream that has been generated by a compression-encoding of moving picture data;

computing a quantizer step size that is used in said re-encoding;

inputting said computed quantizer step size and a quantizer step size in said input compressed moving picture stream and outputting a quantizer step size that is used in actual re-encoding;

selecting a larger quantizer step size from said quantizer step size that is used in re-encoding and said quantizer step size in the input compressed moving picture stream;

performing a re-encoding of said compressed moving picture stream at said received pre-set average bit rate; and outputting said re-encoded compressed moving picture stream.

47. A compressed moving picture re-encoding method that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding method comprising:

computing a quantizer step size that is used in said re-encoding;

inputting said computed quantizer step size and a quantizer step size in said input compressed moving picture stream and outputting a quantizer step size that is used in actual re-encoding;

computing respective complexity measures in two or more kinds of prescribed predetermined periods or numbers of pictures, using either or both of the quantizer step size and a number of bits in either of said input compressed moving picture stream or a re-encoded compressed moving picture stream;

outputting a prescribed complexity measure from a plurality of said complexity measures; and computing said quantizer step size using said pre-set average bit rate and said output complexity measure, wherein said quantizer step size is adjusted every prescribed period according to a difference between a target number of bits and an actual number of bits, to give the quantizer step size that is used in said re-encoding.

48. A compressed moving picture re-encoding method that has an input compressed moving picture stream, generated by a compression-encoding of moving picture data, as an input signal, performs re-encoding at a pre-set average bit rate and at a variable bit rate, and has an output compressed moving picture stream whose bit rate has been changed as an output signal, said compressed moving picture re-encoding method comprising:

computing a quantizer step size that is used in said re-encoding;

inputting said computed quantizer step size and a quantizer step size in said input compressed moving picture stream and outputting a quantizer step size that is used in actual re-encoding;

selecting a larger quantizer step size from said quantizer step size that is used in re-encoding and said quantizer step size in the input compressed moving picture stream;

computing respective complexity measures in two or more kinds of prescribed predetermined periods or numbers of pictures, using either or both of the quantizer step size and a number of bits in either of said input compressed moving picture stream or said re-encoded compressed moving picture stream;

outputting a prescribed complexity measure from a plurality of said complexity measures; and computing said quantizer step size using said pre-set average bit rate and said output complexity measure;

wherein said quantizer step size is adjusted every prescribed period according to a difference between a target number of bits and an actual number of bits, to give the quantizer step size that is used in said re-encoding.

* * * * *